(12) United States Patent
Rubin et al.

(10) Patent No.: US 7,975,305 B2
(45) Date of Patent: Jul. 5, 2011

(54) METHOD AND SYSTEM FOR ADAPTIVE RULE-BASED CONTENT SCANNERS FOR DESKTOP COMPUTERS

(75) Inventors: Moshe Rubin, Jerusalem (IL); Moshe Matitya, Jerusalem (IL); Artem Melnick, Beit Shemesh (IL); Shlomo Touboul, Kefar-Haim (IL); Alexander Yermakov, Beit Shemesh (IL); Amit Shaked, Tel Aviv (IL)

(73) Assignee: Finjan, Inc., San Jose, CA (US)

( * ) Notice: Subject to any disclaimer, the term of this patent is extended or adjusted under 35 U.S.C. 154(b) by 1016 days.

(21) Appl. No.: 11/009,437

(22) Filed: Dec. 9, 2004

(65) Prior Publication Data
US 2005/0240999 A1 Oct. 27, 2005

Related U.S. Application Data

(63) Continuation-in-part of application No. 10/930,884, filed on Aug. 30, 2004, which is a continuation-in-part of application No. 09/539,667, filed on Mar. 30, 2000, now Pat. No. 6,804,780, which is a continuation of application No. 08/964,388, filed on Nov. 6, 1997, now Pat. No. 6,092,194.

(51) Int. Cl.
*G06F 11/00* (2006.01)
*G06F 21/00* (2006.01)
(52) U.S. Cl. .............................. 726/25; 726/22; 713/153
(58) Field of Classification Search ........................ None
See application file for complete search history.

(56) References Cited

U.S. PATENT DOCUMENTS

| | | | |
|---|---|---|---|
| 5,077,677 A | 12/1991 | Murphy et al. | 706/62 |
| 5,359,659 A | 10/1994 | Rosenthal | 726/24 |
| 5,361,359 A | 11/1994 | Tajalli et al. | 726/23 |
| 5,414,833 A * | 5/1995 | Hershey et al. | 726/22 |
| 5,485,409 A | 1/1996 | Gupta et al. | 726/25 |

(Continued)

FOREIGN PATENT DOCUMENTS
EP 1091276 4/2001
(Continued)

OTHER PUBLICATIONS

D Grune, et al.—Parsing Techniques: A Practical Guide, 2000—John Wiley & Sons, Inc. New York, NY, USA, p. 1-326.*

(Continued)

*Primary Examiner* — Emmanuel L Moise
*Assistant Examiner* — Jeffery Williams
(74) *Attorney, Agent, or Firm* — Dawn-Marie Bey; King & Spalding LLP

(57) ABSTRACT

A security system for scanning content within a computer, including a network interface, housed within a computer, for receiving content from the Internet on its destination to an Internet application running on the computer, a database of rules corresponding to computer exploits, stored within the computer, a rule-based content scanner that communicates with said database of rules, for scanning content to recognize the presence of potential exploits therewithin, a network traffic probe, operatively coupled to the network interface and to the rule-based content scanner, for selectively diverting content from its intended destination to the rule-based content scanner, and a rule update manager that communicates with said database of rules, for updating said database of rules periodically to incorporate new rules that are made available. A method and a computer readable storage medium are also described and claimed.

25 Claims, 14 Drawing Sheets

U.S. PATENT DOCUMENTS

| | | | | |
|---|---|---|---|---|
| 5,485,575 | A | 1/1996 | Chess et al. | 714/38 |
| 5,572,643 | A | 11/1996 | Judson | 709/218 |
| 5,579,509 | A | 11/1996 | Furtney et al. | 703/27 |
| 5,606,668 | A | 2/1997 | Shwed | 726/13 |
| 5,623,600 | A | 4/1997 | Ji et al. | 726/24 |
| 5,638,446 | A | 6/1997 | Rubin | 705/51 |
| 5,675,711 | A * | 10/1997 | Kephart et al. | 706/12 |
| 5,692,047 | A | 11/1997 | McManis | 713/167 |
| 5,692,124 | A | 11/1997 | Holden et al. | 726/2 |
| 5,720,033 | A | 2/1998 | Deo | 726/2 |
| 5,724,425 | A | 3/1998 | Chang et al. | 705/52 |
| 5,740,248 | A | 4/1998 | Fieres et al. | 713/156 |
| 5,740,441 | A * | 4/1998 | Yellin et al. | 717/134 |
| 5,761,421 | A | 6/1998 | van Hoff et al. | 709/223 |
| 5,765,205 | A | 6/1998 | Breslau et al. | 711/203 |
| 5,784,459 | A | 7/1998 | Devarakonda et al. | 713/165 |
| 5,796,952 | A | 8/1998 | Davis et al. | 709/224 |
| 5,805,829 | A | 9/1998 | Cohen et al. | 709/202 |
| 5,832,208 | A | 11/1998 | Chen et al. | 726/24 |
| 5,832,274 | A | 11/1998 | Cutler et al. | 717/171 |
| 5,850,559 | A | 12/1998 | Angelo et al. | 713/320 |
| 5,859,966 | A | 1/1999 | Hayman et al. | 726/23 |
| 5,864,683 | A | 1/1999 | Boebert et al. | 709/249 |
| 5,881,151 | A * | 3/1999 | Yamamoto | 726/24 |
| 5,884,033 | A * | 3/1999 | Duvall et al. | 709/206 |
| 5,892,904 | A | 4/1999 | Atkinson et al. | 726/22 |
| 5,951,698 | A | 9/1999 | Chen et al. | 714/38 |
| 5,956,481 | A | 9/1999 | Walsh et al. | 726/23 |
| 5,963,742 | A * | 10/1999 | Williams | 717/143 |
| 5,974,549 | A | 10/1999 | Golan | 726/23 |
| 5,978,484 | A | 11/1999 | Apperson et al. | 705/54 |
| 5,983,348 | A * | 11/1999 | Ji | 726/13 |
| 5,987,611 | A * | 11/1999 | Freund | 726/4 |
| 6,088,801 | A * | 7/2000 | Grecsek | 726/1 |
| 6,088,803 | A * | 7/2000 | Tso et al. | 726/22 |
| 6,092,194 | A | 7/2000 | Touboul | 726/24 |
| 6,154,844 | A | 11/2000 | Touboul et al. | 726/24 |
| 6,167,520 | A | 12/2000 | Touboul | 726/23 |
| 6,339,829 | B1 | 1/2002 | Beadle et al. | 726/15 |
| 6,425,058 | B1 | 7/2002 | Arimilli et al. | 711/134 |
| 6,434,668 | B1 | 8/2002 | Arimilli et al. | 711/128 |
| 6,434,669 | B1 | 8/2002 | Arimilli et al. | 711/128 |
| 6,480,962 | B1 | 11/2002 | Touboul | 726/22 |
| 6,487,666 | B1 | 11/2002 | Shanklin et al. | 726/23 |
| 6,519,679 | B2 | 2/2003 | Devireddy et al. | 711/114 |
| 6,598,033 | B2 * | 7/2003 | Ross et al. | 706/46 |
| 6,732,179 | B1 | 5/2004 | Brown et al. | 709/229 |
| 6,804,780 | B1 | 10/2004 | Touboul | 713/181 |
| 6,917,953 | B2 | 7/2005 | Simon et al. | 707/204 |
| 7,058,822 | B2 | 6/2006 | Edery et al. | 726/22 |
| 7,143,444 | B2 | 11/2006 | Porras et al. | 726/30 |
| 7,210,041 | B1 * | 4/2007 | Gryaznov et al. | 713/188 |
| 7,308,648 | B1 | 12/2007 | Buchthal et al. | 715/234 |
| 7,343,604 | B2 | 3/2008 | Grabarnik et al. | 719/313 |
| 7,418,731 | B2 | 8/2008 | Touboul | 726/22 |
| 2002/0059157 | A1* | 5/2002 | Spooner et al. | 706/45 |
| 2002/0066024 | A1* | 5/2002 | Schmall et al. | 713/200 |
| 2002/0073330 | A1* | 6/2002 | Chandnani et al. | 713/200 |
| 2003/0014662 | A1 | 1/2003 | Gupta et al. | 726/23 |
| 2003/0101358 | A1 | 5/2003 | Porras et al. | 726/4 |
| 2004/0073811 | A1* | 4/2004 | Sanin | 713/201 |
| 2004/0088425 | A1* | 5/2004 | Rubinstein et al. | 709/230 |
| 2005/0050338 | A1 | 3/2005 | Liang et al. | 713/188 |
| 2005/0172338 | A1 | 8/2005 | Sandu et al. | 726/22 |
| 2006/0031207 | A1 | 2/2006 | Bjarnestam et al. | 707/3 |
| 2006/0048224 | A1 | 3/2006 | Duncan et al. | 726/22 |
| 2008/0066160 | A1 | 3/2008 | Becker et al. | 726/4 |
| 2010/0195909 | A1* | 8/2010 | Wasson et al. | 382/176 |

FOREIGN PATENT DOCUMENTS

EP        1132796        9/2001

OTHER PUBLICATIONS

International Search Report for Application No. PCT/IL05/00915, 4 pp., dated Mar. 3, 2006.
Zhong, et al., "Security in the Large: is Java's Sandbox Scalable?," *Seventh IEEE Symposium on Reliable Distributed Systems*, pp. 1-6, Oct. 1998.
Rubin, et al., "Mobile Code Security," *IEEE Internet*, pp. 30-34, Dec. 1998.
Schmid, et al. "Protecting Data From Malicious Software," *Proceeding of the 18th Annual Computer Security Applications Conference*, pp. 1-10, 2002.
Corradi, et al., "A Flexible Access Control Service for Java Mobile Code," *IEEE*, pp. 356-365, 2000.
International Search Report for Application No. PCT/IB97/01626, 3 pp., May 14, 1998 (mailing date).
Written Opinion for Application No. PCT/IL05/00915, 5 pp., dated Mar. 3, 2006 (mailing date).
International Search Report for Application No. PCT/IB01/01138, 4 pp., Sep. 20, 2002 (mailing date).
International Preliminary Examination Report for Application No. PCT/IB01/01138, 2 pp., dated Dec. 19, 2002.
Gerzic, Amer, "Write Your Own Regular Expression Parser," Nov. 17, 2003, 18 pp., Retrieved from the Internet: http://www.codeguru.com/Cpp/Cpp/cpp_mfc/parsing/article.php/c4093/.
Power, James, "Lexical Analysis," 4 pp., May 14, 2006, Retrieved from the Internet: http://www.cs.may.ie/~jpower/Courses/compilers/notes/lexical.pdf.
Sitaker, Kragen, "Rapid Genetic Evolution of Regular Expressions" [online], *The Mial Archive*, Apr. 24, 2004 (retrieved on Dec. 7, 2004), 5 pp., Retrieved from the Internet: http://www.mail-archive.com/kragen-tol@canonical.org/msg00097.html.
"Lexical Analysis: DFA Minimization & Wrap Up" [online], Fall, 2004 [retrieved on Mar. 2, 2005], 8 pp., Retrieved from the Internet: http://www.owlnet.rice.edu/~comp412/Lectures/L06LexWrapup4.pdf.
"Minimization of DFA" [online], [retrieved on Dec. 7, 2004], 7 pp., Retrieved from the Internet: http://www.cs.odu.edu/~toida/nerzic/390teched/regular/fa/min-fa.html.
"Algorithm: NFS -> DFA" [online], Copyright 1999-2001 [retrieved on Dec. 7, 2004], 4 pp., Retrieved from the Internet: http://rw4.cs.uni-sb.de/~ganimal/GANIFA/page16_e.htm.
"CS 3813: Introduction to Formal Languages and Automata—State Minimization and Other Algorithms for Finite Automata," 3 pp., May 11, 2003, Retrieved from the Internet: http://www.cs.msstate.edu/~hansen/classes/3813fall01/slides/06Minimize.pdf.
Watson, Bruce W., "Constructing Minimal Acyclic Deterministic Finite Automata," [retrieved on Mar. 20, 2005], 38 pp., Retrieved from the Internet: http://www.win.tue.nl/~watson/2R870/downloads/madfa_algs.pdf.
Chang, Chia-Hsiang, "From Regular Expressions to DFA's Using Compressed NFA's," Oct. 1992, 243 pp., http://www.cs.nyu.edu/web/Research/Theses/chang_chia-hsiang.pdf.
"Products," Articles published on the Internet, "Revolutionary Security for a New Computing Paradigm" regarding SurfinGate™, 7 pp.
"Release Notes for the Microsoft ActiveX Development Kit," Aug. 13, 1996, activex.adsp.or.jp/inetsdk/readme.txt, pp. 1-10.
Doyle, et al., "Microsoft Press Computer Dictionary," Microsoft Press, 2d Edition, pp. 137-138, 1993.
Finjan Software Ltd., "Powerful PC Security for the New World of Java™ and Downloadables, Surfin Shield™," Article published on the Internet by Finjan Software Ltd., 2 pp. 1996.
Finjan Sofrtware Ltd., "Finjan Announces a Personal Java™ Firewall for Web Browsers—the SurfinShield™ 1.6 (formerly known s SurfinBoard)," Press Release of Finjan Releases SurfinShield 1.6, 2 pp., Oct. 21, 1996.
Finjan Software Ltd., "Finjan Announces Major Power Boost and New Features for SurfinShield™ 2.0," Las Vegas Convention Center/Pavillion 5 P5551, 3 pp., Nov. 18, 1996.
Finjan Software Ltd., "Finjan Software Releases SurfinBoard, Industry's First JAVA Security Product for the World Wide Web," Article published on the Internet by Finjan Software Ltd., 1 p., Jul. 29, 1996.
Finjan Software Ltd., "Java Security: Issues & Solutions," Article published on the Internet by Finjan Software Ltd., 8 pp. 1996.
Finjan Software Ltd., Company Profile, "Finjan—Safe Surfing, The Java Security Solutions Provider," Article published on the Internet by Finjan Software Ltd., 3 pp., Oct. 31, 1996.

"IBM AntiVirus User's Guide, Version 2.4,", International Business Machines Corporation, pp. 6-7, Nov. 15, 1995.

Khare, R., "Microsoft Authenticode Analyzed" [online], Jul. 22, 1996 [retrieved on Jun. 25, 2003], 2 pp., Retrieved from the Internet: http://www.xent.com/FoRK-archive/smmer96/0338.html.

LaDue, M., Online Business Consultant: Java Security: Whose Business is It?, Article published on the Internet, Home Page Press, Inc., 4 pp., 1996.

Leach, Norvin, et al., "IE 3.0 Applets Will Earn Certification," *PC Week*, vol. 13, No. 29, 2 pp., Jul. 22, 1996.

Moritz, R., "Why We Shouldn't Fear Java," *Java Report*, pp. 51-56, Feb. 1997.

Microsoft, "Microsoft ActiveX Software Development Kit" [online], Aug. 12, 1996 [retrieved on Jun. 25, 2003], pp. 1-6, Retrieved from the Internet: activex.adsp.or.jp/inetsdk/help/overview.htm.

Microsoft® Authenticode Technology, "Ensuring Accountability and Authenticity for Software Components on the Internet," Microsoft Corporation, Oct. 1996, including Abstract, Contents, Introduction, and pp. 1-10.

Microsoft Corporation, Web Page Article "Frequently Asked Questions About Authenticode," last updated Feb. 17, 1997, printed Dec. 23, 1998, URL: http://www.microsoft.com/workshop/security/authcode/signfaq.asp#9, pp. 1-13.

Okamoto, E., et al., "ID-Based Authentication System for Computer Virus Detection," *IEEE/IEE Electronic Library online, Electronics Letters*, vol. 26, Issue 15, ISSN 0013-5194, Jul. 19, 1990, Abstract and pp. 1169-1170, URL: http://iel.ihs.com:80/cgi-bin/iel_cgi?se...2ehts%26ViewTemplate%3ddocview%5fb%2ehts.

Omura, J. K., "Novel Applications of Cryptography in Digital Communications," *IEEE Communications Magazine*, pp. 21-29, May 1990.

Schmitt, D.A., ".EXE files, OS-2 style," *PC Tech Journal*, vol. 6, No. 11, p. 76(13), Nov. 1988.

Zhang, X. N., "Secure Code Distribution," *IEEE/IEE Electronic Library online, Computer*, vol. 30, Issue 6, pp. 76-79, Jun. 1997.

Power, James, "Notes on Formal Language Theory and Parsing," National University of Ireland, pp. 1-40, 1999.

* cited by examiner

METHOD AND SYSTEM FOR ADAPTIVE RULE-BASED CONTENT SCANNERS FOR DESKTOP COMPUTERS

CROSS REFERENCES TO RELATED APPLICATIONS

This application is a continuation-in-part of assignee's pending application U.S. Ser. No. 10/930,884, filed on Aug. 30, 2004, entitled "Method and System for Adaptive Rule-Based Content Scanners," which is a continuation-in-part of assignee's application U.S. Ser. No. 09/539,667, filed on Mar. 30, 2000, now U.S. Pat. No. 6,804,780, entitled "System and Method for Protecting a Computer and a Network from Hostile Downloadables," which is a continuation of assignee's patent application U.S. Ser. No. 08/964,388, filed on 6 Nov. 1997, now U.S. Pat. No. 6,092,194, also entitled "System and Method for Protecting a Computer and a Network from Hostile Downloadables."

FIELD OF THE INVENTION

The present invention relates to network security, and in particular to scanning of mobile content for exploits.

BACKGROUND OF THE INVENTION

Conventional anti-virus software scans a computer file system by searching for byte patterns, referred to as signatures that are present within known viruses. If a virus signature is discovered within a file, the file is designated as infected.

Content that enters a computer from the Internet poses additional security threats, as such content executes upon entry into a client computer, without being saved into the computer's file system. Content such as JavaScript and VBScript is executed by an Internet browser, as soon as the content is received within a web page.

Conventional network security software also scans such mobile content by searching for heuristic virus signatures. However, in order to be as protective as possible, virus signatures for mobile content tend to be over-conservative, which results in significant over-blocking of content. Over-blocking refers to false positives; i.e., in addition to blocking of malicious content, prior art technologies also block a significant amount of content that is not malicious.

Another drawback with prior art network security software is that it is unable to recognize combined attacks, in which an exploit is split among different content streams. Yet another drawback is that prior art network security software is unable to scan content containers, such as URI within JavaScript.

All of the above drawbacks with conventional network security software are due to an inability to diagnose mobile code. Diagnosis is a daunting task, since it entails understanding incoming byte source code. The same malicious exploit can be encoded in an endless variety of ways, so it is not sufficient to look for specific signatures.

Nevertheless, in order to accurately block malicious code with minimal over-blocking, a thorough diagnosis is required.

SUMMARY OF THE DESCRIPTION

The present invention enables behavioral analysis of content. As distinct from prior art approaches that search for byte patterns, the approach of the present invention is to analyze incoming content in terms of its programmatic behavior. Behavioral analysis is an automated process that parses and diagnoses a software program, to determine if such program can carry out an exploit.

The present invention provides a method and system for scanning content that includes mobile code, to produce a diagnostic analysis of potential exploits within the content. The present invention is preferably used within a network gateway or proxy, to protect an intranet against viruses and other malicious mobile code.

The content scanners of the present invention are referred to as adaptive rule-based (ARB) scanners. An ARB scanner is able to adapt itself dynamically to scan a specific type of content, such as inter alia JavaScript, VBScript, URI, URL and HTML. ARB scanners differ from prior art scanners that are hard-coded for one particular type of content. In distinction, ARB scanners are data-driven, and can be enabled to scan any specific type of content by providing appropriate rule files, without the need to modify source code. Rule files are text files that describe lexical characteristics of a particular language. Rule files for a language describe character encodings, sequences of characters that form lexical constructs of the language, referred to as tokens, patterns of tokens that form syntactical constructs of program code, referred to as parsing rules, and patterns of tokens that correspond to potential exploits, referred to as analyzer rules. Rules files thus serve as adaptors, to adapt an ARB content scanner to a specific type of content.

The present invention also utilizes a novel description language for efficiently describing exploits. This description language enables an engineer to describe exploits as logical combinations of patterns of tokens.

Thus it may be appreciated that the present invention is able to diagnose incoming content for malicious behavior. As such, the present invention achieves very accurate blocking of content, with minimal over-blocking as compared with prior art scanning technologies.

There is thus provided in accordance with a preferred embodiment of the present invention a security system for scanning content within a computer, including a network interface, housed within a computer, for receiving content from the Internet on its destination to an Internet application running on the computer, a database of rules corresponding to computer exploits, stored within the computer, a rule-based content scanner that communicates with said database of rules, for scanning content to recognize the presence of potential exploits therewithin, a network traffic probe, operatively coupled to the network interface and to the rule-based content scanner, for selectively diverting content from its intended destination to the rule-based content scanner, and a rule update manager that communicates with said database of rules, for updating said database of rules periodically to incorporate new rules that are made available.

There is moreover provided in accordance with a preferred embodiment of the present invention a method for scanning content within a computer, including receiving content from the Internet on its destination to an Internet application, selectively diverting the received content from its intended destination, scanning the selectively diverted content to recognize potential exploits therewithin, based on a database of rules corresponding to computer exploits, and updating the database of rules periodically to incorporate new rules that are made available.

There is further provided in accordance with a preferred embodiment of the present invention a computer-readable storage medium storing program code for causing a computer to perform the steps of receiving content from the Internet on its destination to an Internet application, selectively diverting the received content from its intended destination, scanning the selectively diverted content to recognize potential exploits therewithin, based on a database of rules corresponding to computer exploits, and updating the database of rules periodically to incorporate new rules that are made available.

There is yet further provided in accordance with a preferred embodiment of the present invention, a method for network security, including scanning content received over a computer network for potential malicious code, the intended destination of the content being a software application, including deriving a hash value for the received content, querying a local security cache for the presence of the hash value, the local security cache storing hash values for content and corresponding security profiles, whereby security profiles identify potentially malicious code within content, and if the querying is affirmative, then retrieving a security policy for the content from the local security cache, else if the querying is not affirmative, then deriving a security profile for the received content, storing the hash value and the derived security policy in the local security cache, and transmitting the hash value and the security policy to a central security cache, and periodically updating the local security cache with hash values and corresponding security profiles from the central security cache.

There is additionally provided in accordance with a preferred embodiment of the present invention a network security system including a plurality of inter-connected computers within a network, each of the plurality of computers including a local security cache that stores hash values for content and corresponding content security profiles, whereby security profiles identify potentially malicious code within content, a scanner that communicates bi-directionally with the local security cache, for (i) examining incoming content and deriving a hash value therefor, the intended destination of the content being a software application; (ii) querying the local security cache for the presence of the derived hash value; and (iii) examining incoming content and deriving a security profile therefor, and a central security cache storing hash values for content and corresponding content security profiles, to which hash values and corresponding security profiles are received from the plurality of inter-connected computers, and from which updated hash values and corresponding security profiles are transmitted to the plurality of local security caches.

There is moreover provided in accordance with a preferred embodiment of the present invention a computer-readable storage medium storing program code for causing a computer to perform the steps of scanning content received over a computer network for potential malicious code, the intended destination of the content being a software application, including deriving a hash value for the received content, querying a local security cache for the presence of the hash value, the local security cache storing hash values for content and corresponding security profiles, whereby security profiles identify potentially malicious code within content, and if the querying is affirmative, then retrieving a security policy for the content from the local security cache, else if the querying is not affirmative, then deriving a security profile for the received content, storing the hash value and the derived security policy in the local security cache, and transmitting the hash value and the security policy to a central security cache, and periodically updating the local security cache with hash values and corresponding security profiles from the central security cache.

There is further provided in accordance with a preferred embodiment of the present invention a network security system including a first scanner that analyzes incoming content under general operational conditions, without executing the content, and derives a security profile for the content that identifies conditionally malicious code therein, which is malicious or non-malicious depending upon values of operational data, and a second scanner, connected in series with the first scanner, that analyzes the content under specific operational conditions corresponding to specific values of the operational data, by executing the content, and modifies the security profile for the content if the conditionally malicious code identified in the security profile is found to be malicious for the specific values of the operational data.

There is yet further provided in accordance with a preferred embodiment of the present invention a method for network security, including analyzing incoming content under general operational conditions, without executing the content, deriving a security profile for the content that identifies conditionally malicious code therein, which is malicious or non-malicious depending upon values of operational data, if the security profile identifies conditionally malicious code within the content, then further analyzing the content under specific operational conditions corresponding to specific values of the operational data, by executing the content, and modifying the security profile for the content if the conditionally malicious code identified in the security profile is found to be malicious for the specific values of the operational data, so as to identify the conditionally malicious code as being malicious.

There is yet further provided in accordance with a preferred embodiment of the present invention a computer-readable storage medium storing program code for causing a computer to perform the steps of analyzing incoming content under general operational conditions, without executing the content, deriving a security profile for the content that identifies conditionally malicious code therein, which is malicious or non-malicious depending upon values of operational data, if the security profile identifies conditionally malicious code within the content, then further analyzing the content under specific operational conditions corresponding to specific values of the operational data, by executing the content, and modifying the security profile for the content if the conditionally malicious code identified in the security profile is found to be malicious for the specific values of the operational data, so as to identify the conditionally malicious code as being malicious.

BRIEF DESCRIPTION OF THE DRAWINGS

The present invention will be more fully understood and appreciated from the following detailed description, taken in conjunction with the drawings in which.

LIST OF APPENDICES

Appendix A is a source listing of an ARB rule file for the JavaScript language, in accordance with a preferred embodiment of the present invention.

DETAILED DESCRIPTION

The present invention concerns scanning of content that contains mobile code, to protect an enterprise against viruses and other malicious code.

Figure 1:
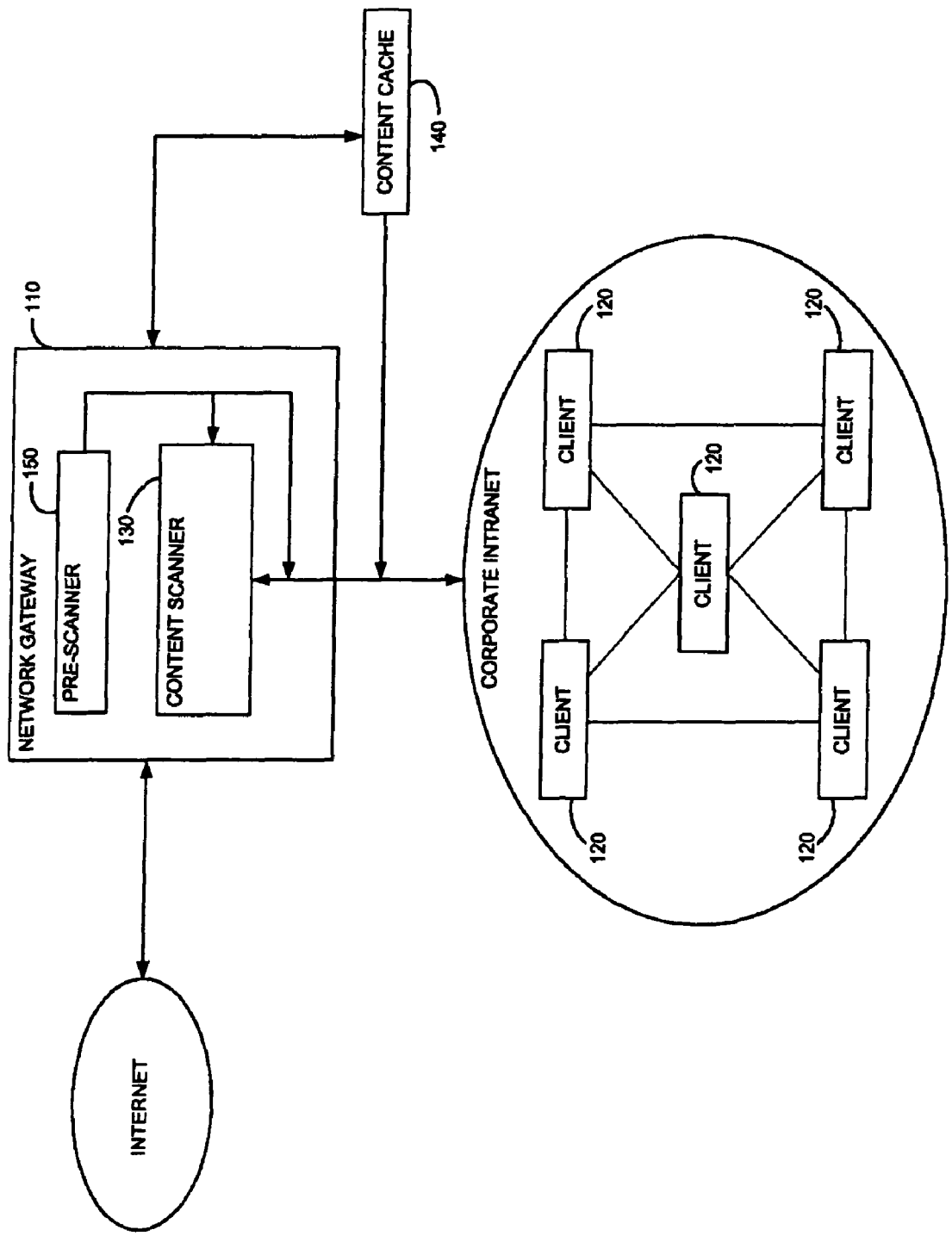
FIG. 1 is a simplified block diagram of an overall gateway security system that uses an adaptive rule-based (ARB) content scanner, in accordance with a preferred embodiment of the present invention.

Reference is now made to FIG. 1, which is a simplified block diagram of an overall gateway security system that uses an adaptive rule-based (ARB) content scanner, in accordance with a preferred embodiment of the present invention. Shown in FIG. 1 is a network gateway 110 that acts as a conduit for content from the Internet entering into a corporate intranet, and for content from the corporate intranet exiting to the Internet. One of the functions of network gateway 10 is to protect client computers 120 within the corporate intranet from malicious mobile code originating from the Internet. Mobile code is program code that executes on a client computer. Mobile code can take many diverse forms, including inter alia JavaScript, Visual Basic script, HTML pages, as well as a Uniform Resource Identifier (URI).

Mobile code can be detrimental to a client computer. Mobile code can access a client computer's operating system and file system, can open sockets for transmitting data to and from a client computer, and can tie up a client computer's processing and memory resources. Such malicious mobile code cannot be detected using conventional anti-virus scanners, which scan a computer's file system, since mobile code is able to execute as soon as it enters a client computer from the Internet, before being saved to a file. Thus it may be appreciated that the security function of network gateway 110 is critical to a corporate intranet.

Many examples of malicious mobile code are known today. Portions of code that are malicious are referred to as exploits. For example, one such exploit uses JavaScript to create a window that fills an entire screen. The user is then unable to access any windows lying underneath the filler window. The following sample code shows such an exploit.

---
EXAMPLE EXPLOIT
---
```
<!DOCTYPE HTML PUBLIC "-//W3C//DTD HTML
4.0 Transitional//EN">
<HTML>
<HEAD>
<TITLE>BID-3469</TITLE>
<SCRIPT>
    op=window.createPopup( );
    s='<body>foobar</body>';
    op.document.body.innerHTML=s;
    function oppop( )
    {
        if (!op.isOpen)
            op.show(0,0, screen.width, screen.height, document.body);
    }
    function doit ( )
    {
        oppop( );
        setInterval("window.focus( ); {oppop( );}",10);
    }
</SCRIPT>
</HEAD>
<BODY>
<H1>BID-3469</H1>
<FORM method=POST action="">
<INPUT type="button" name="btnDoIt" value="Do It" onclick="doit( )">
</FORM>
</BODY>
</HTML>
```
---

The command
op.show(0,0, screen.width, screen.height, document.body)
is responsible for opening a window that fills the entire screen. It may be appreciated that there are many equivalents to such command. For example, the section of code ---
```
{
    w = screen.width;
    h = screen.height;
    op.show(0,0, w, h, document.body);
}
```
--- performs the same action of opening a window that fills the entire screen; as also does the section of code ---
```
{
    a = screen.width;
    b = screen.height;
    w = a;
    h = b;
    op.show(0,0, w, h, document.body);
}.
```
---

In distinction, although it appears similar, the section of code

---
```
{
    w = screen.width;
    h = screen.height;
    w = 10;
    h = 10;
    op.show(0,0, w, h, document.body);
}
```
--- does not fill the screen, and may be part of non-malicious content.

Furthermore, each variation of code section takes on a different binary form when streamed within JavaScript, and thus requires a different signature for detection. Thus it may be appreciated that conventional signature-based anti-virus detection is incapable of coping with the unlimited number of variants of a virus. Instead, what is required, even for known exploits, is a behavioral approach that analyses content based on its behavior instead of its binary structure.

In accordance with a preferred embodiment of the present invention, network gateway 110 includes a content scanner 130, whose purpose is to scan mobile code and identify potential exploits. Content scanner 130 receives as input content containing mobile code in the form of byte source, and generates a security profile for the content. The security profile indicates whether or not potential exploits have been discovered within the content, and, if so, provides a diagnostic list of one or more potential exploits and their respective locations within the content.

Preferably, the corporate intranet uses a security policy to decide whether or not to block incoming content based on the content's security profile. For example, a security policy may block content that may be severely malicious, say, content that accesses an operating system or a file system, and may permit content that is less malicious, such as content that can consume a user's computer screen as in the example above. The diagnostics within a content security profile are compared with the intranet security policy, and a decision is made to allow or block the content. When content is blocked, one or more alternative actions can be taken, such as replacing suspicious portions of the content with innocuous code and allowing the modified content, and sending a notification to an intranet administrator.

Scanned content and their corresponding security profiles are preferably stored within a content cache 140. Preferably, network gateway 110 checks if incoming content is already resident in cache 140, and, if so, bypasses content scanner 130. Use of cache 140 saves content scanner 130 the task of re-scanning the same content.

Alternatively, a hash value of scanned content, such as an MD5 hash value, can be cached instead of caching the content itself. When content arrives at scanner 130, preferably its hash value is computed and checked against cached hash values. If a match is found with a cached hash value, then the content does not have to be re-scanned and its security profile can be obtained directly from cache.

Consider, for example, a complicated JavaScript file that is scanned and determined to contain a known exploit therewithin. An MD5 hash value of the entire JavaScript file can be stored in cache, together with a security profile indicating that the JavaScript file contains the known exploit. If the same JavaScript file arrives again, its hash value is computed and found to already reside in cache. Thus, it can immediately be determined that the JavaScript file contains the known exploit, without re-scanning the file.

It may be appreciated by those skilled in the art that cache 140 may reside at network gateway 110. However, it is often advantageous to place cache 140 as close as possible to the corporate intranet, in order to transmit content to the intranet as quickly as possible. However, in order for the security profiles within cache 140 to be up to date, it is important that network gateway 110 notify cache 140 whenever content scanner 130 is updated. Updates to content scanner 130 can occur inter alia when content scanner 130 is expanded (i) to cover additional content languages; (ii) to cover additional exploits; or (iii) to correct for bugs.

Preferably, when cache 140 is notified that content scanner 130 has been updated, cache 140 clears its cache, so that content that was in cache 140 is re-scanned upon arrival at network gateway 110.

Also, shown in FIG. 1 is a pre-scanner 150 that uses conventional signature technology to scan content. As mentioned hereinabove, pre-scanner 150 can quickly determine if content is innocuous, but over-blocks on the safe side. Thus pre-scanner 150 is useful for recognizing content that poses no security threat. Preferably, pre-scanner 150 is a simple signature matching scanner, and processes incoming content at a rate of approximately 100 mega-bits per second. ARB scanner 130 performs much more intensive processing than pre-scanner 150, and processes incoming content at a rate of approximately 1 mega-bit per second.

In order to accelerate the scanning process, pre-scanner 150 acts as a first-pass filter, to filter content that can be quickly recognized as innocuous. Content that is screened by pre-scanner 150 as being potentially malicious is passed along to ARB scanner 130 for further diagnosis. Content that is screened by pre-scanner 150 as being innocuous bypasses ARB scanner 130. It is expected that pre-scanner 150 filters 90% of incoming content, and that only 10% of the content requires extensive scanning by ARB scanner 130. As such, the combined effect of ARB scanner 130 and pre-scanner 150 provides an average scanning throughout of approximately 9 mega-bits per second.

Use of security profiles, security policies and caching is described in applicant's U.S. Pat. No. 6,092,194 entitled SYSTEM AND METHOD FOR PROTECTING A COMPUTER AND A NETWORK FROM HOSTILE DOWNLOADABLES, in applicant's U.S. Pat. No. 6,804,780 entitled SYSTEM AND METHOD FOR PROTECTING A COMPUTER AND A NETWORK FROM HOSTILE DOWNLOADABLES, and in applicant's U.S. Pat. No. 7,418,731 entitled METHOD AND SYSTEM FOR CACHING AT SECURE GATEWAYS.

Figure 2:
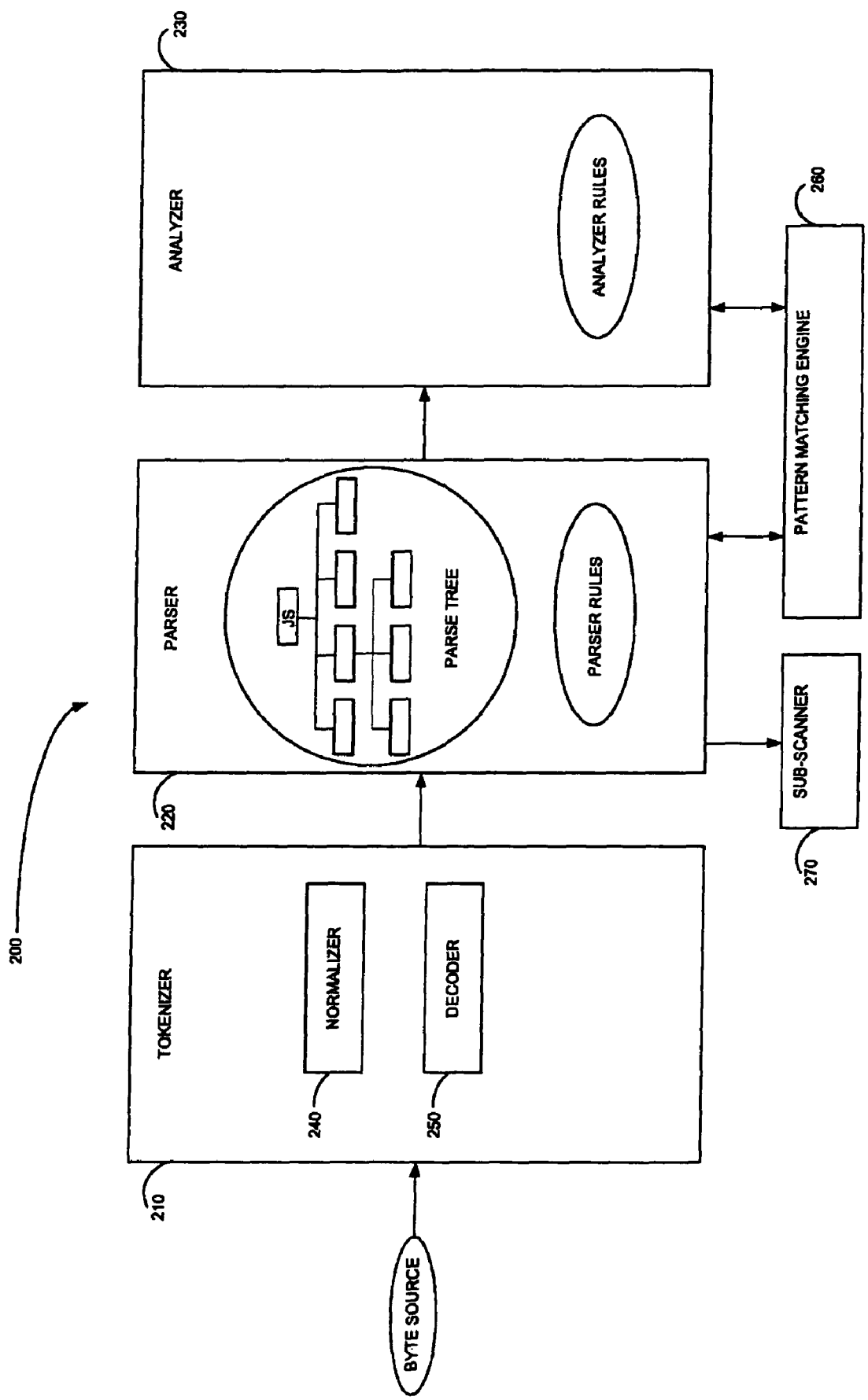
FIG. 2 is a simplified block diagram of an adaptive rule-based content scanner system, in accordance with a preferred embodiment of the present invention.

Reference is now made to FIG. 2, which is a simplified block diagram of an adaptive rule-based content scanner system 200, in accordance with a preferred embodiment of the present invention. An ARB scanner system is preferably designed as a generic architecture that is language-independent, and is customized for a specific language through use of a set of language-specific rules. Thus, a scanner system is customized for JavaScript by means of a set of JavaScript rules, and is customized for HTML by means of a set of HTML rules. In this way, each set of rules acts as an adaptor, to adapt the scanner system to a specific language. A sample rule file for JavaScript is provided in Appendix A, and is described hereinbelow.

Moreover, in accordance with a preferred embodiment of the present invention, security violations, referred to as exploits, are described using a generic syntax, which is also language-independent. It is noted that the same generic syntax used to describe exploits is also used to describe languages. Thus, referring to Appendix A, the same syntax is used to describe the JavaScript parser rules and the analyzer exploit rules.

It may thus be appreciated that the present invention provides a flexible content scanning method and system, which can be adapted to any language syntax by means of a set of rules that serve to train the content scanner how to interpret the language. Such a scanning system is referred to herein as an adaptive rule-based (ARB) scanner. Advantages of an ARB scanner, include inter alia:

the ability to re-use software code for many different languages;

the ability to re-use software code for binary content and EXE files;

the ability to focus optimization efforts in one project, rather than across multiple projects; and the ability to describe exploits using a generic syntax, which can be interpreted by any ARB scanner.

The system of FIG. 2 includes three main components: a tokenizer 210, a parser 220 and an analyzer 230. The function of tokenizer 210 is to recognize and identify constructs, referred to as tokens, within a byte source, such as JavaScript source code. A token is generally a sequence of characters delimited on both sides by a punctuation character, such as a white space. Tokens includes inter alia language keywords, values, names for variables or functions, operators, and punctuation characters, many of which are of interest to parser 220 and analyzer 230.

Preferably, tokenizer 210 reads bytes sequentially from a content source, and builds up the bytes until it identifies a complete token. For each complete token identified, tokenizer 210 preferably provides both a token ID and the token sequence.

In a preferred embodiment of the present invention, the tokenizer is implemented as a finite state machine (FSM) that takes input in the form of character codes. Tokens for the language are encoded in the FSM as a sequence of transitions for appropriate character codes, as described hereinbelow with reference to FIG. 3. When a sequence of transitions forms a complete lexical token, a punctuation character, which normally indicates the end of a token, is expected. Upon receiving a punctuation character, the token is complete, and the tokenizer provides an appropriate ID. If a punctuation character is not received, the sequence is considered to be part of a longer sequence, and no ID is provided at this point.

Figure 3:
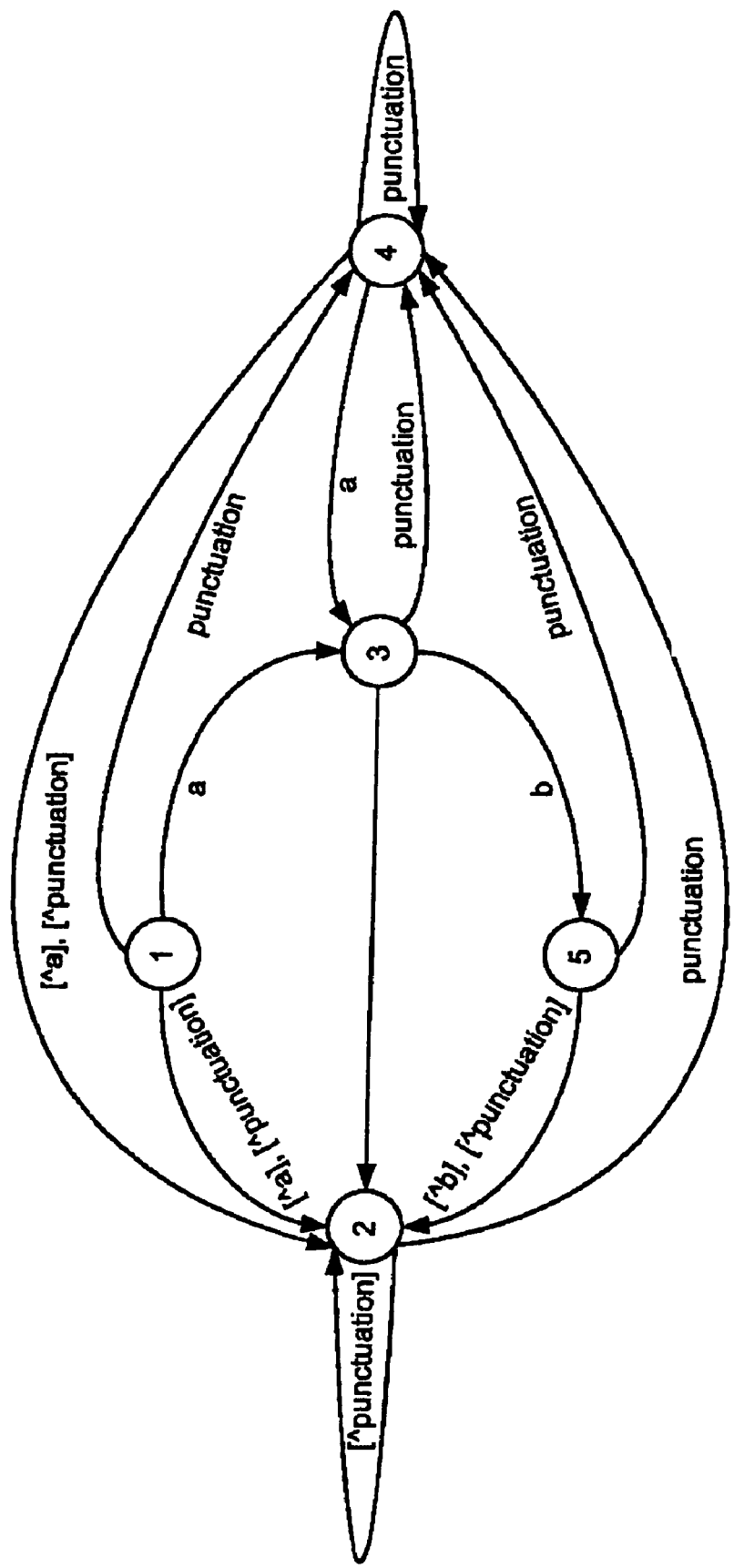
FIG. 3 is an illustration of a simple finite state machine for detecting tokens "a" and "ab", used in accordance with a preferred embodiment of the present invention.

Reference is now made to FIG. 3, which is an illustration of a simple finite state machine for detecting tokens "a" and "ab", used in accordance with a preferred embodiment of the present invention. Shown in FIG. 3 are five states, 1-5, with labeled and directed transitions therebetween. As tokenizer reads successive characters, a transition is made from a current state to a next state accordingly. State 1 is an entry state, where tokenizer 210 begins. State 4 is a generic state for punctuation. Specifically, whenever a punctuation character is encountered, a transition is made from the current state to state 4. The "a" token is identified whenever a transition is made from state 3 to state 4. Similarly, the "ab" token is identified whenever a transition is made from state 5 to state 4. A generic token, other than "a" and "ab" is identified whenever a transition is made from state 2 to state 4. A punctuation token is identified whenever a transition is made out of state 4.

Referring back to FIG. 2, tokenizer 210 preferably includes a normalizer 240 and a decoder 250. In accordance with a preferred embodiment of the present invention, normalizer 240 translates a raw input stream into a reduced set of character codes. Normalized output thus becomes the input for tokenizer 210. Examples of normalization rules includes, inter alia skipping character ranges that are irrelevant;

assigning special values to character codes that are irrelevant for the language structure but important for the content scanner;

translating, such as to lowercase if the language is case-insensitive, in order to reduce input for tokenizer 210;

merging several character codes, such as white spaces and line ends, into one; and translating sequences of raw bytes, such as trailing spaces, into a single character code.

Preferably, normalizer 240 also handles Unicode encodings, such as UTF-8 and UTF-16.

In accordance with a preferred embodiment of the present invention, normalizer 240 is also implemented as a finite-state machine. Each successive input is either translated immediately according to normalization rules, or handled as part of a longer sequence. If the sequence ends unexpectedly, the bytes are preferably normalized as individual bytes, and not as part of the sequence.

Preferably, normalizer 240 operates in conjunction with decoder 250. Preferably, decoder 250 decodes character sequences in accordance with one or more character encoding schemes, including inter alia (i) SGML entity sets, including named sets and numerical sets; (ii) URL escape encoding scheme; (iii) ECMA script escape sequences, including named sets, octal, hexadecimal and Unicode sets; and (iv) character-encoding switches.

Preferably, decoder 250 takes normalized input from normalizer 240. In accordance with a preferred embodiment of the present invention, decoder 250 is implemented as a finite-state machine. The FSM for decoder 250 terminates when it reaches a state that produces a decoded character. If decoder 250 fails to decode a sequence, then each character is processed by tokenizer 210 individually, and not as part of the sequence. Preferably, a plurality of decoders 250 can be pipelined to enable decoding of text that is encoded by one escape scheme over another, such as text encoded with a URL scheme and then encoded with ECMA script scheme inside of JavaScript strings.

Tokenizer 210 and normalizer 240 are generic modules that can be adapted to process any content language, by providing a description of the content language within a rule file. Preferably, the rule file describes text characters used within the content language, and the composition of constructs of the content language, referred to as tokens. Tokens may include inter alia, an IDENT token for the name of a variable or function, various punctuation tokens, and tokens for keywords such as NEW, DELETE, FOR and IF. A sample rule file for JavaScript is provided in Appendix A, and is described hereinbelow.

In accordance with a preferred embodiment of the present invention, parser 220 controls the process of scanning incoming content. Preferably, parser 220 invokes tokenizer 210, giving it a callback function to call when a token is ready. Tokenizer 210 uses the callback function to pass parser 220 the tokens it needs to parse the incoming content. Preferably, parser 220 uses a parse tree data structure to represent scanned content. A parse tree contains a node for each token identified while parsing, and uses parsing rules to identify groups of tokens as a single pattern. Examples of parsing rules appear in Appendix A, and are described hereinbelow.

Preferably, the parse tree generated by parser 220 is dynamically built using a shift-and-reduce algorithm. Successive tokens provided to parser 220 by tokenizer 210 are positioned as siblings. When parser 220 discovers that a parsing rule identifies a group of siblings as a single pattern, the siblings are reduced to a single parent node by positioning a new parent node, which represents the pattern, in their place, and moving them down one generation under the new parent note.

Preferably, within the parse tree, each node contains data indicating inter alia an ID number, the token or rule that the node represents, a character string name as a value for the node, and a numerical list of attributes. For example, if the node represents an IDENT token for the name of a variable, then the value of the node is the variable name; and if the node represents a rule regarding a pattern for a function signature, then the value of the node is the function name.

In addition, whenever a parsing rule is used to recognize a pattern, information about the pattern may be stored within an internal symbol table, for later use.

In a preferred embodiment of the present invention, parsing rules are implemented as finite-state machines. These FSMs preferably return an indicator for (i) an exact match, (ii) an indicator to continue with another sibling node, or (iii) an indicator of a mis-match that serves as an exit.

More generally, parsing rules may be implemented using a hybrid mix of matching algorithms. Thus, it may use a deterministic finite automaton (DFA) for quick identification of rule candidates, and a non-deterministic finite automaton (NFA) engine for exact evaluation of the candidate rules.

Figures 1, 4A:
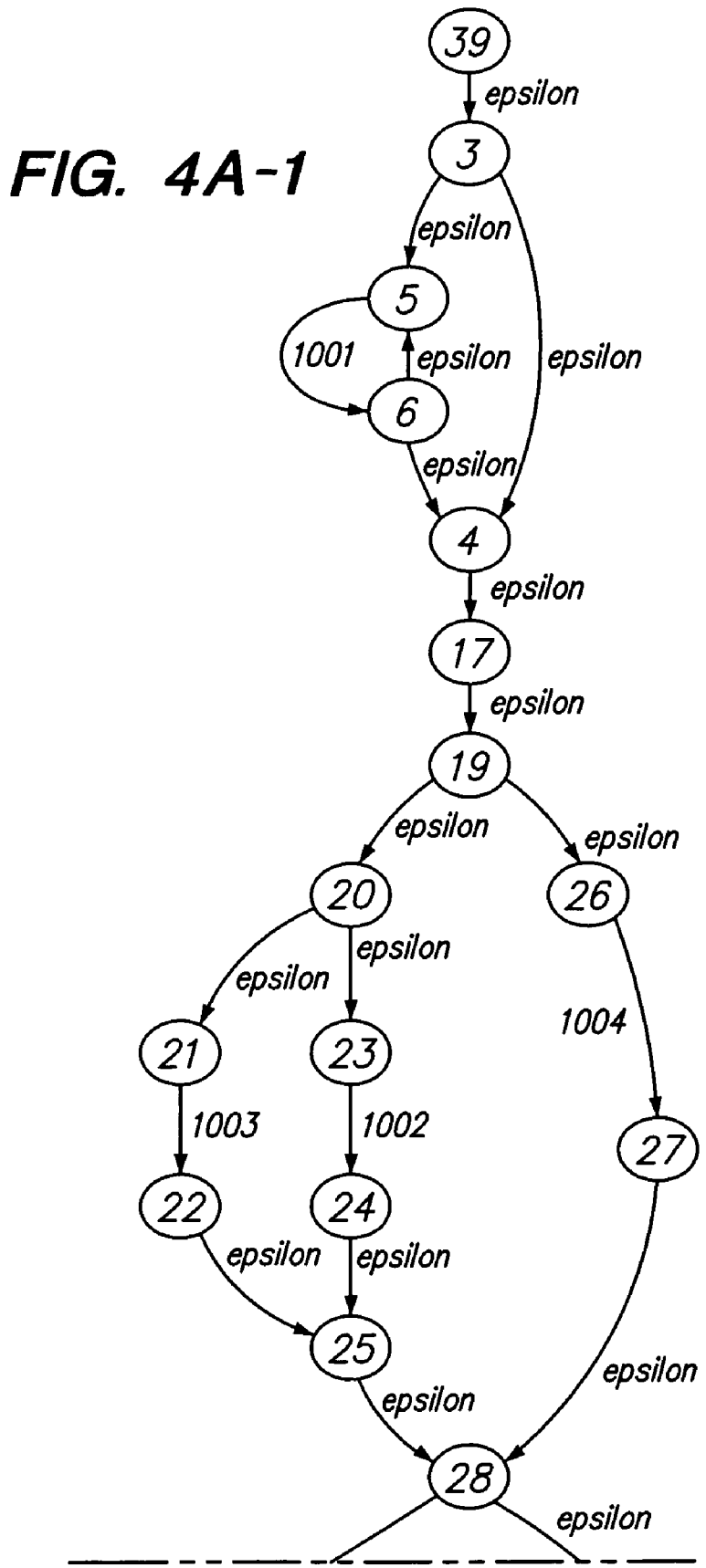
FIG. 4A is an example of a non-deterministic finite automaton (NFA) for matching a pattern of tokens.
Figures 2, 4A:
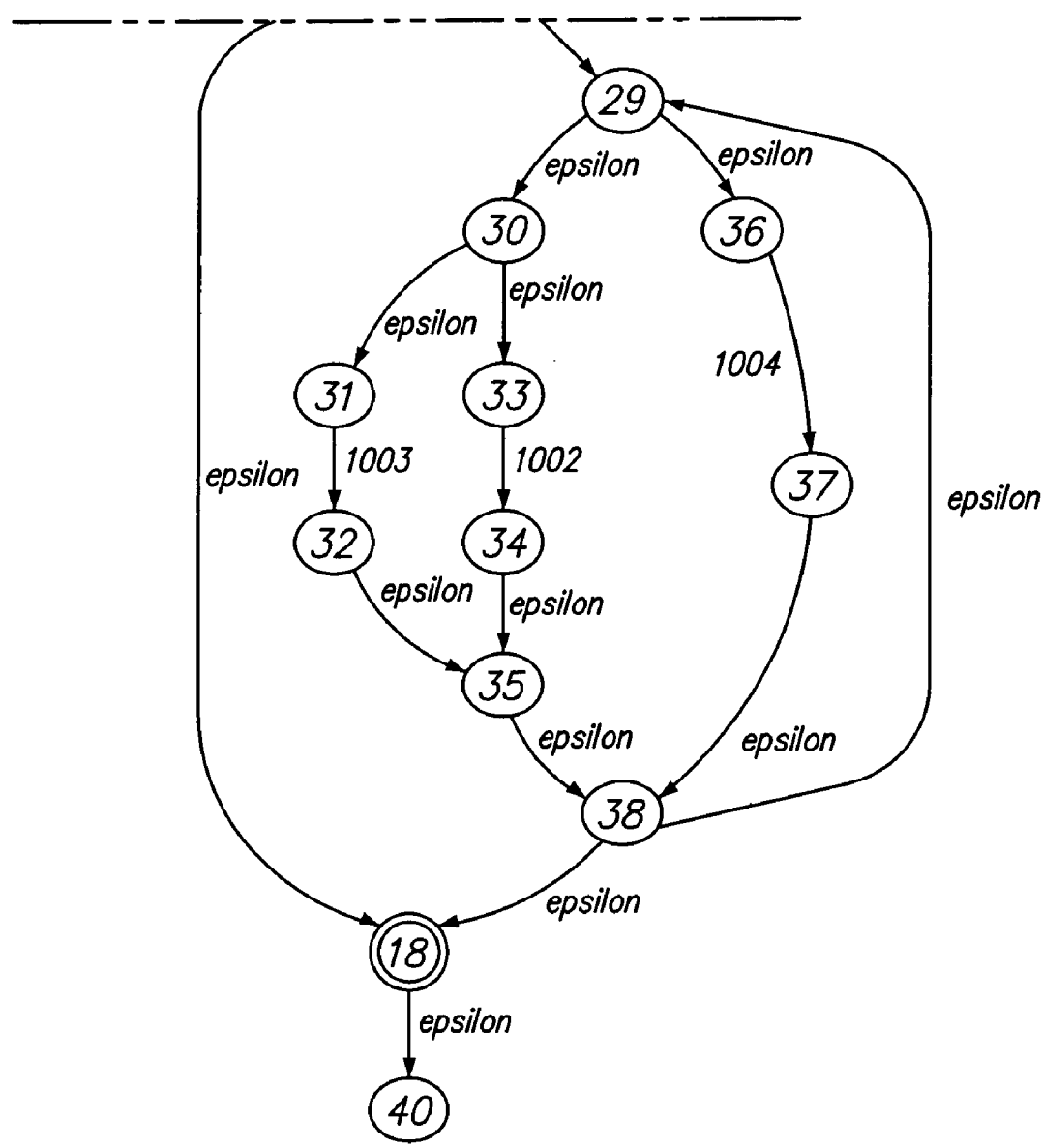

DFA and NFA are well known in the art of compilers, as finite-state machine engines for pattern matching. Reference is now made to FIG. 4A, which is an example of an NFA for the pattern 1001*^[1002 ! 1003 ! 1004]+; i.e., a pattern of tokens with zero or more occurrences of 1001 followed by one or more occurrences of any of the three tokens 1002, 1003, 1004. The NFA is a directed graph with nodes and directed edges therebetween. The edges are labeled with token identifiers, and with a special symbol "epsilon." Edges marked with token identifiers can only be traversed if the current token being processed matches the token for the edge. Edges marked with the symbol "epsilon" serve as pass-through nodes, and can be traversed at will, without reference to a token. The NFA attempts to find a path from a starting node 39 to a finishing node 40, via the directed edges, as successive tokens from an input sequence are processed. The path should be maximal in the sense that there is no edge to traverse for the next token in the input sequence. Searching for such a maximal path is often referred to in the art as a "greedy" algorithm.

For example, if the sequence of tokens 1001 1002 1003 1004 1001 is input, then the NFA processes the four tokens 1001 1002 1003 1004 and proceeds through the path with successive nodes 39, 3, 5, 6, 4, 17, 19, 20, 23, 24, 25, 28, 29, 30, 31, 32, 35, 38, 29, 36, 37, 38, 18 and 40. The token 1001 is matched at node 5, the token 1002 is matched at node 23, the token 1003 is matched at node 32 and the token 1004 is matched at node 36. However, from node 36 there is no sequence of edges that can match the next token 1001, and thus the NFA terminates successfully with the pattern 1001 1002 1003 1004.

In distinction, if the sequence of tokens 1001 1001 1001 is input, then the NFA processes the three 1001 tokens and proceeds through the path with successive nodes 39, 3, 5, 6, 5, 6, 5 and 6, from which point it fails to reach finishing node 40 for lack of an appropriate token to pass through any of nodes 21, 23 and 26.

It is noted that some of the nodes in FIG. 4A, such as nodes 3, 6, 19, 28 and 29, have more than one permissible outgoing edge labeled "epsilon." The property of having more than one choice of edge to traverse at a given stage of processing, is what characterizes finite automata as being non-deterministic. At such nodes the NFA may have to back track and try more than one path in order to find a match. Thus at node 29, the NFA may try to follow a path through node 30 and, if unsuccessful, then back track to node 29 and follow a path through node 36. For this reason, although NFA are simpler to derive, they are often not as efficient as DFA.

Figure 4B:
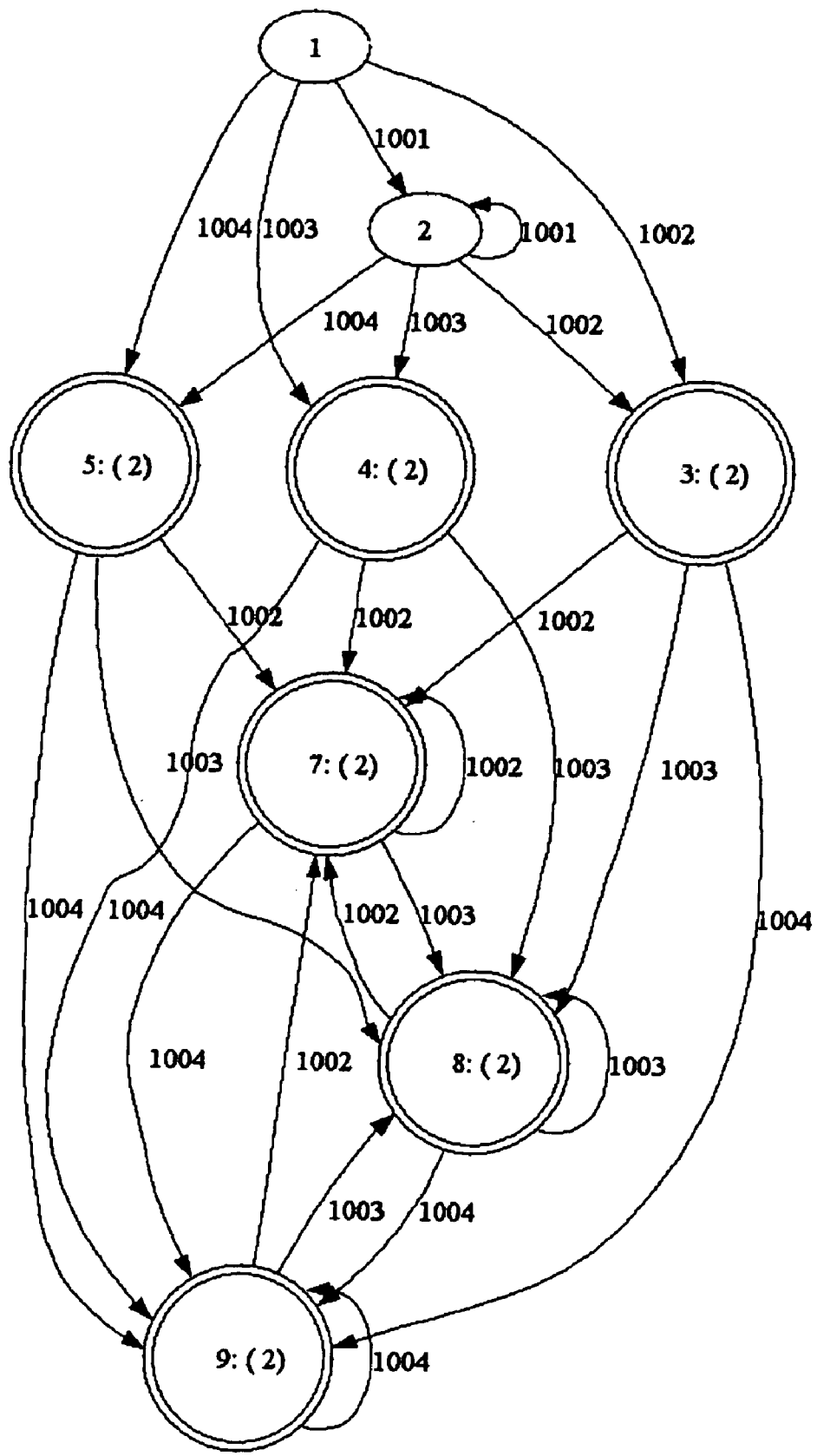
FIG. 4B is an example of a deterministic finite automaton (DFA) which is equivalent to the NFA of FIG. 4A.

Reference is now made to FIG. 4B, which is a DFA corresponding to the NFA of FIG. 4A. In contrast to the NFA of FIG. 4A, there are no nodes in the DFA labeled "epsilon," and each node in the DFA has at most one permissible outgoing edge, for any given token. As such, there is no need for the DFA to ever back track. All of the nodes with double circles around them are finishing nodes. If the sequence of tokens 1001 1002 1003 1004 1001 is input, then the DFA processes the tokens 1001 1002 1003 1004 and proceeds through the path with successive nodes 1, 2, 3, 8 and 9. There is no outgoing edge at node 9 corresponding to the next token 1001 in the input sequence. As such, the DFA terminates successfully with the pattern 1001 1002 1003 1004.

Generation of a DFA equivalent to a given NFA is well known in the art of compilers, and generally uses algorithms referred to as "subset construction" and "DFA minimization." In accordance with a preferred embodiment of the present invention, parser rules, and also analyzer rules described hereinbelow, are stored as an NFA engine, a DFA engine, or another finite-state machine engine. Preferably, the finite-state machine engine for a rule is generated by a rule compiler, which receives as input a semantic description of the rule such as the rule descriptions shown in Appendix A, formulated perhaps by a software engineer, and generates as output an appropriate finite-state machine engine.

In addition to a pattern, a parser rule optionally includes one or more actions to be performed if an exact pattern match is discovered. Actions that can be performed include inter alia creating a new node in the parse tree, as described hereinabove with respect to the shift and reduce algorithm; setting internal variables; invoking a sub-scanner 270, as described hereinbelow; and searching the parse tree for nodes satisfying specific conditions. By default, when the pattern within a parser rule is matched, parser 220 automatically performs a reduce operation by creating a new node and moving token nodes underneath the new node. A rule may be assigned a NoCreate attribute, in which case the default is changed to not performing the reduction operation upon a match, unless an explicit addnode command is specified in an action for the rule.

Sub-scanner 270 is another ARB scanner, similar to scanner 200 illustrated in FIG. 2 but for a different type of content. Preferably, sub-scanner 270 is used to scan a sub-section of input being processed by scanner 200. Thus, if an HTML scanner encounters a script element that contains JavaScript code, then there will be a rule in the HTML scanner whose action includes invoking a JavaScript scanner. In turn, the JavaScript scanner may invoke a URI scanner. Use of sub-scanner 270 is particularly efficient for scanning content of one type that contains content of another type embedded therein.

Preferably, immediately after parser 220 performs a reduce operation, it calls analyzer 230 to check for exploits. Analyzer 230 searches for specific patterns of content that indicate an exploit.

Preferably, parser 220 passes to analyzer 230 a newly-created parsing node. Analyzer 230 uses a set of analyzer rules to perform its analysis. An analyzer rule specifies a generic syntax pattern in the node's children that indicates a potential exploit. An analyzer rule optionally also includes one or more actions to be performed when the pattern of the rule is matched. In addition, an analyzer rule optionally includes a description of nodes for which the analyzer rule should be examined. Such a description enables analyzer 230 to skip nodes that are not to be analyzed. Preferably, rules are provided to analyzer 230 for each known exploit. Examples of analyzer rules appear in Appendix A, and are described hereinbelow.

As described hereinabove with respect to parser rules, analyzer rules are also preferably represented by finite-state machines such as NFAs and DFAs.

Preferably, the nodes of the parse tree also include data for analyzer rules that are matched. Specifically, if analyzer 230 discovers that one or more analyzer rules are matched at a specific parsing tree node, then the matched rules are added to a list of matched rules stored within the node.

An advantage of the present invention is that both parser 220 and analyzer 230 use a common ARB regular expression syntax. As such, a common pattern matching engine 260 performs pattern matching for both parser 220 and analyzer 230. In accordance with a preferred embodiment of the present invention, pattern matching engine 260 accepts as input (i) a list of ARB regular expression elements describing a pattern of interest; and (ii) a list of nodes from the parse tree to be matched against the pattern of interest. Preferably, pattern matching engine 260 returns as output (i) a Boolean flag indicating whether or not a pattern is matched; and (ii) if the pattern is matched, positional variables that match grouped portions of the pattern. For example, if a pattern "(IDENT) EQUALS NUMBER" is matched, then $1 is preferably set to a reference to the nodes involved in the IDENT token. That is, if a matched pattern is "(1 2 3) 4 5", then $1 refers to the nodes 1, 2 and 3 as a single group.

Figure 5:
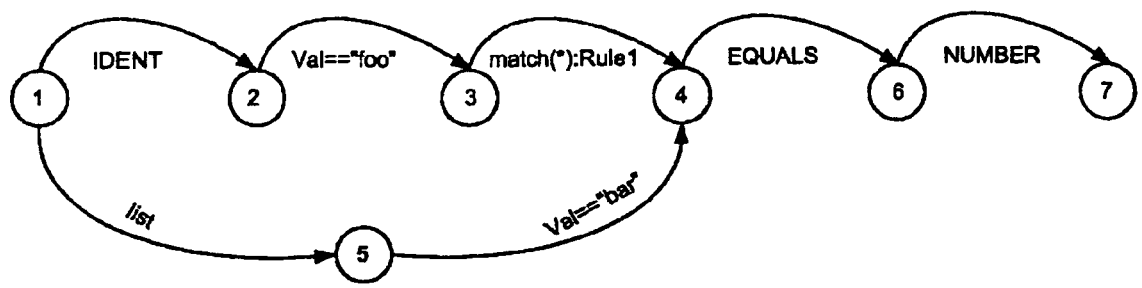
FIG. 5 is an illustration of a simple finite state machine for a pattern, used in accordance with a preferred embodiment of the present invention.

Preferably, the ARB regular expression that is input to pattern matching engine 260 is pre-processed in the form of a state machine for the pattern. Reference is now made to FIG. 5, which is an illustration of a simple finite state machine, used in accordance with a preferred embodiment of the present invention, for a pattern,
(IDENT<val="foo" & match(*):
 Rule1>|List<val="bar">) EQUALS NUMBER
Specifically, the pattern of interest specifies either an IDENT token with value "foo" and that matches Rule1, or a List with value "bar", followed by an EQUALS token and a NUMBER token.

Reference is now made to Appendix A, which is a source listing of an ARB rule file for the JavaScript language, in accordance with a preferred embodiment of the present invention. The listing in Appendix A is divided into six main sections, as follows: (i) vchars, (ii) tokens, (iii) token_pairs, (iv) attribs, (v) parser_rules and (vi) analyzer_rules.

The vchars section includes entries for virtual characters. Each such entry preferably conforms to the syntax

```
vchar vchar-name [action=string] (char | hex-num)
{
    vchar-pattern*
}
For example, the entry
vchar n1 0x0d
{
    [0x0d]+;
    [0x0a]+
}
``` converts a sequence of one or more CRs (carriage-returns) and a sequence of one or more LFs (line-feeds) to a newline meta-character.

The vchars section also includes entries for aliases, which are names for special virtual characters. Each such entry preferably conforms to the syntax

```
vchar_alias vchar-name
{
    hex-num
}
For example, the entry
Vchar_alias underscore
{
    0x5F;
}
``` identifies the hexadecimal number 0x5F with the name "underscore".

The tokens section includes entries for language tokens for a scanner language; namely, JavaScript for Appendix A. Each such entry preferably conforms to the syntax token-entry* (cdata);
For example, the entry
LBRACE "[!left_curly_bracket!]" punct;
defines identifies a punctuation token, LBRACE, as a "left_curly_bracket", which is an alias for 0x7B as defined in the previous vchars section. Note that aliases are preferably surrounded by exclamation points.

A CDATA token, for identifying strings or commented text, preferably conforms to the syntax
"start" "end" ["escape-pattern] "skip-pattern";
For example, the entry
DOUBLE_QUOTE  DOUBLE_QUOTE  "[!backslash!][!double_quote]?" "[^[backslash!][!double_quote !]]+";
identifies a string as beginning and ending with a DOUBLE-QUOTE token, as previously defined, with an escape pattern that has a "backslash" followed by zero or one "double_quote", and a skip pattern that has one or more characters other than "backslash" and "double_quote".

The token_pairs section defines tokens that can validly appear in juxtaposition, and tokens that cannot validly appear in juxtaposition, in conformance with the language rules. Generally, when the tokenizer encounters an invalid juxtaposition, it inserts a virtual semi-colon. An entry for a token-pair preferably conforms to the syntax
{valid|invalid}  [(|token-ID|token-ID]*[)]  [(| token-ID|token-ID]*[)];
For example, the entry
invalid IF (ELSE|FOR|WHILE|DOT);
indicates that an IF token cannot validly be followed by an ELSE, FOR, WHILE or DOT token. Thus, if an IF token followed by an ELSE, FOR, WHILE, or DOT token is encountered in the input, tokenizer 210 will insert a virtual delimiter character between them.

The Parser-rules section has entries defining rules for the parser. Such entries preferably conform to the syntax
rule rule-name [nonode] [noanalyze] [nomatch]

```
{
    [patterns
    {
        ID-pattern*;
    }]
    [actions
    {
        action*;
    }]
}
```

A pattern is a regular expression of IDs, preferably conforming to the syntax $ID_1$-expr $ID_2$-expr . . . $ID_n$-expr Preferably, ID-expr is one of the following:
   ID
   (ID [ID]*)
   ID<val==val>
   ID<id==rule-ID>
   ID<match(n): rule-ID>
   ID<match(*): rule-ID>
   ID<match(m,n): rule-ID>
The modifiers '*', '+', '?', '{m}' and '{m,n}' are used conventionally as follows:

| | |
|---|---|
| '*' | zero or more occurrences |
| '+' | one or more occurrences |
| '?' | zero or one occurrence |
| '{m}' | exactly m occurrences |
| '{m, n}' | between m and n occurrences, inclusive |

For example, the pattern in the rule for FuncSig
(FUNCTION)(IDENT?)(List)
describes a keyword "function", followed by zero or one IDENT token, and followed by a "List". In turn, the pattern in the rule for List
(LPAREN)((Expr)(COMMA Expr)*)(RPAREN)
describes a LPAREN token and a RPAREN token surrounding a list of zero or more Expr's separated by COMMA tokens. In turn, the pattern in the rule for Expr
([ExprDelimTokens ExprLdelimTokens ExprLdelimRules]?
   ([^ ExprDelimTokens ExprLdelimTokens ExprLdelim-
   Rules ExprExcludeRules ExprRdelimTokens]+) [ExprDe-
   limTokens ExprRdelimTokens])|([ExprStmntRules]);
describes a general definition of what qualifies as an expression, involving delimiter tokens and other rules.

An action prescribes an action to perform when a pattern is matched. For example, the action in the rule for FuncSig
this.val=$(2).val;
@("FUNCNAME").val=$(2).val;
assigns a value to FuncSig, which is the value of the second parameter in the pattern for FuncSig; namely, the value of the IDENT token. In addition, the action assigns this same value to an entry in a symbol table called "FUNCNAME", as described hereinbelow. It may thus be appreciated that certain rules have values associated therewith, which are assigned by the parser as it processes the tokens.

The symbol table mentioned hereinabove is an internal table, for rules to store and access variables.

The analyzer-rules section has entries defining rules for the parser. Such entries preferably conform to the syntax
rule rule-name [nonode] [noanalyze] [nomatch]

```
{
   [nodes
   {
      ID-pattern;
   }]
   [patterns
   {
      ID-pattern*;
   }]
   [actions
   {
      action*;
   }]
}
```

Patterns and actions for analyzer rules are similar to patterns and actions for parser rules.

Referring back to the example above, the pattern
(IDENT) ASSIGNMENT IDENT<val=="screen">DOT
   IDENT<val=="width">
within the rule for ScrWidAssign describes a five-token pattern; namely, (i) an IDENT token, followed by (ii) an ASSIGNMENT token, followed by (iii) an IDENT token that has a value equal to "screen", followed by (iv) a DOT token, and followed by (v) an IDENT token that has a value equal to "width". Preferably, the value of an IDENT (i.e., an identifier) is its name; thus such a pattern indicates use of a member reference "screen.width" within an assignment statement, and corresponds to the example exploit listed above in the discussion of FIG. 1. For example, it corresponds to an assignment of the form
   w=screen.width
The action
   @($(1).val).attr+=ATTR_SCRWID
within the ScrWidAssign rule assigns the attribute ATTR_SCRWID to the symbol table entry whose name is the value of the IDENT token on the left side of the pattern. Specifically, for the example above the attribute ATTR_SCRWID is assigned to the symbol table entry for w.

Similarly, the pattern
LPAREN    Expr    COMMA    Expr    COMMA
   Expr<attr?=ATTR_SCRWID>COMMA
   Expr<attr?=ATTR_SCRHGT>;
within the rule for ScrWidHgtList identifies an eight-token pattern; namely, (i) an LPAREN token (i.e., a left parenthesis), followed by (ii) an expression Expr, followed by (iii) a COMMA token (i.e., a comma), followed by (iv) another Expr, followed by (v) another COMMA token, followed by (vi) an Expr with attribute equal to ATTR_SCRWID, followed by (vii) another COMMA token, and followed by (viii) an Expr with attribute equal to ATTR_SCRHGT). Such a pattern includes inter alia any pattern
   op.show(0,0, w, h, document.body)
for which w is a variable with attribute ATTR_SCRWID and h is a variable with attribute ATTR_SCRHGT.

Preferably, attributes are passed through assignments. For example, if an assignment is encountered of the form
   a=w
where w is a variable with attribute ATTR_SCRWID, then the attribute ATTR_SCRWID is assigned to the symbol table entry for a. Similarly, if an assignment of the form
   w=10
is encountered, then the symbol table entry for w will no longer have the attribute ATTR_SCRWID. Thus it may be appreciated that analyzer rules are able to distinguish successfully between the malicious and non-malicious versions of code in the example above.

Similarly, the pattern
IDENT<@(val).attr?=ATTR_WINDOW>DOT
   FuncCall<val=="show" & matches(1):RULE(ScrWidH-
   gtList)>;
in the rule for WndShowScmWidHgt1 corresponds to the command
   op.show(0,0, w, h, document.body)
in the example exploit above; and the pattern
(IDENT)    ASSIGNMENT    IDENT<@(val).
   attr?=ATTR_WINDOW>DOT
   FuncCall<val=="createPopup">$;
in the rule for CreatePopup1 corresponds to the command
   op=window.createPopup( ).
The action for the rule for Begin assigns attribute ATTR_WINDOW to the symbol table entry to "window", and thus the action for CreatePopup1 assigns this attribute ATTR_WINDOW to the symbol table value for op. In turn, the rule for WndShowScrnWidHight1 recognizes that op satisfies the condition<@(val).attr?=ATTR_WINDOW.

It may thus be appreciated that exploits are generally described in terms of composite pattern matches, involving logical combinations of more than one pattern.

Node patterns within analyzer rules preferably specify nodes for which an analyzer rule should be evaluated. Node patterns serve to eliminate unnecessary analyses.

Referring back to FIG. 2, when parser 220 finds a pattern match for a specific parser rule, it preferably creates a node in the parser tree, and places the matching nodes underneath the newly created node. Preferably, parser 220 assigns the name of the specific rule to the name of the new node. However, if the rule has a "nonode" attribute, then such new node is not created.

After performing the actions associated with the specific rule, parser 220 preferably calls analyzer 230, and passes it the newly-created parser node of the parser tree. However, if the rule has a "noanalyzer" attribute, then analyzer 230 is not called.

When analyzer 230 finds a pattern match for a specific analyzer rule, it preferably adds the matched rule to the parser tree. However, if the rule has a "nomatch" attribute, then the matched rule is not added to the parser tree.

Figure 6:
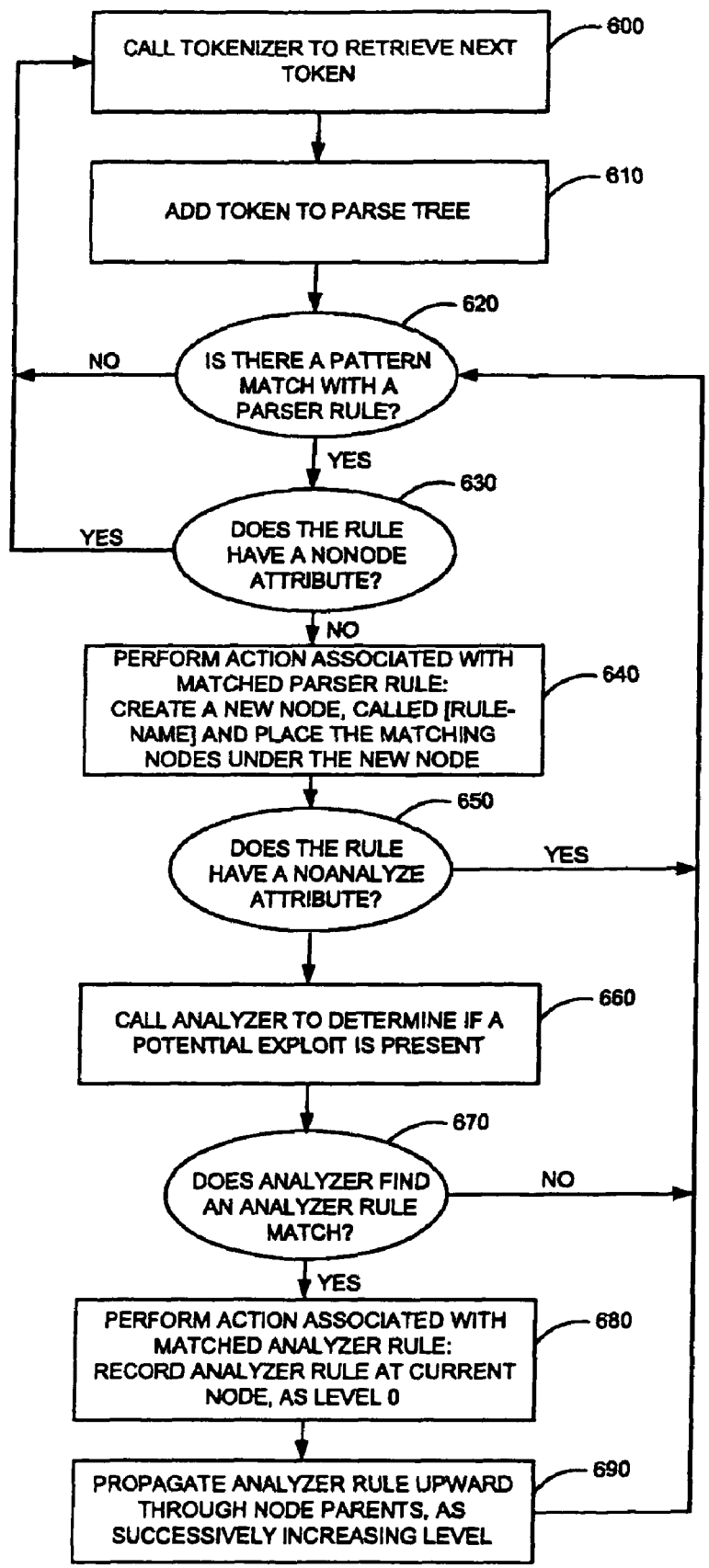
FIG. 6 is a simplified flowchart of operation of a parser for a specific content language within an ARB content scanner, in accordance with a preferred embodiment of the present invention.

Reference is now made to FIG. 6, which is a simplified flowchart of operation of a parser for a specific content language, such as parser 220 (FIG. 2), within an ARB content scanner, such as content scanner 130 (FIG. 1), in accordance with a preferred embodiment of the present invention. Prior to beginning the flowchart in FIG. 6, it is assumed that the parser has initialized a parse tree with a root node. At step 600, the parser calls a tokenizer, such as tokenizer 210, to retrieve a next token from an incoming byte stream. At step 610 the parser adds the token retrieved by the tokenizer as a new node to a parse tree. Preferably, new nodes are added as siblings until a match with a parser rule is discovered.

Nodes within the parse tree are preferably named; i.e., they have an associated value that corresponds to a name for the node. Preferably, new nodes added as siblings are named according to the name of the token they represent.

At step 620 the parser checks whether or not a pattern is matched, based on parser rules within a rule file for the specific content language. If not, then control returns to step 600, for processing the next token. If a match with a parser rule is discovered at step 620, then at step 630 the parser checks whether or not the matched parser rule has a "nonode" attribute. If so, then control returns to step 600. If the matched parser rule does not have a "nonode" attribute, then at step 640 the parser performs the matched parser rule's action. Such action can include inter alia creation of a new node, naming the new node according to the matched parser rule, and placing the matching nodes underneath the new node, as indicated at step 640. Thus it may be appreciated that nodes within the parse tree have names that correspond either to names of tokens, or names of parser rules.

At step 650 the parser checks whether or not the matched parser rule has a "noanalyze" attribute. If so, then control returns to step 620. If the matched parser rule does not have a "noanalyze" attribute, then at step 660 the parser calls an analyzer, such as analyzer 230, to determine if a potential exploit is present within the current parse tree. It may thus be appreciated that the analyzer is called repeatedly, while the parse tree is being dynamically built up.

After checking the analyzer rules, the analyzer returns its diagnostics to the parser. At step 670 the parser checks whether or not the analyzer found a match for an analyzer rule. If not, then control returns to step 600. If the analyzer did find a match, then at step 680 the parser performs the matched analyzer rule's action. Such action can include inter alia recording the analyzer rule as data associated with the current node in the parse tree; namely, the parent node that was created at step 640, as indicated at step 680.

Figure 7:
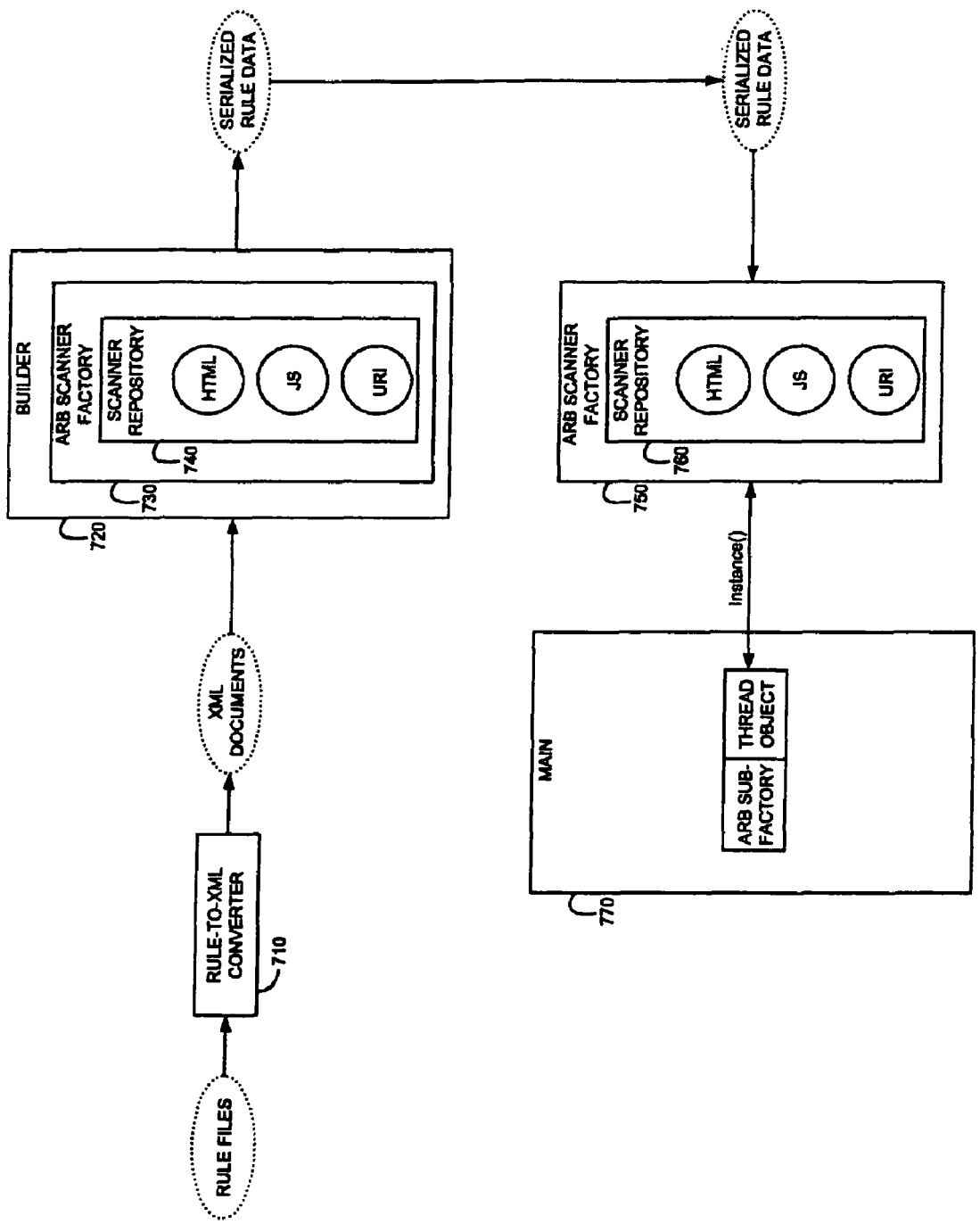
FIG. 7 is a simplified block diagram of a system for serializing binary instances of ARB content scanners, transmitting them to a client site, and regenerating them back into binary instances at the client site, in accordance with a preferred embodiment of the present invention.

In accordance with a preferred embodiment of the present invention, binary class instances of ARB scanners are packaged serially, for transmission to and installation at a client site. Reference is now made to FIG. 7, which is a simplified block diagram of a system for serializing binary instances of ARB content scanners, transmitting them to a client site, and regenerating them back into binary instances at the client site. The workflow in FIG. 7 begins with a set of rule files for one or more content languages. Preferably, the rule files are generated by one or more people who are familiar with the content languages.

A rule-to-XML convertor 710 converts rule files from ARB syntax into XML documents, for internal use. Thereafter a builder module 720 is invoked. Preferably, builder module 720 generates a serialized rule data file, referred to herein as an archive file.

In turn, ARB scanner factory module 730 is responsible for producing an ARB scanner on demand. Preferably, an ARB scanner factory module has a public interface as follows:

```
class arbScannerFactory
{
    INT32 createScanner(const std::string& mimeType,
    arbScanner** scanner);
    INT32 retireScanner(arbScanner *scanner,
    INT32& factoryStillActive);
    Bool hasScannerType(const std::string& mimeType);
}
```

ARB scanner factory module 730 is also responsible for pooling ARB scanners for later re-use.

ARB scanner factory module 730 instantiates a scanner repository 740. Repository 740 produces a single instance of each ARB scanner defined in the archive file. Preferably, each instance of an ARB scanner is able to initialize itself and populate itself with the requisite data.

Figure 8:
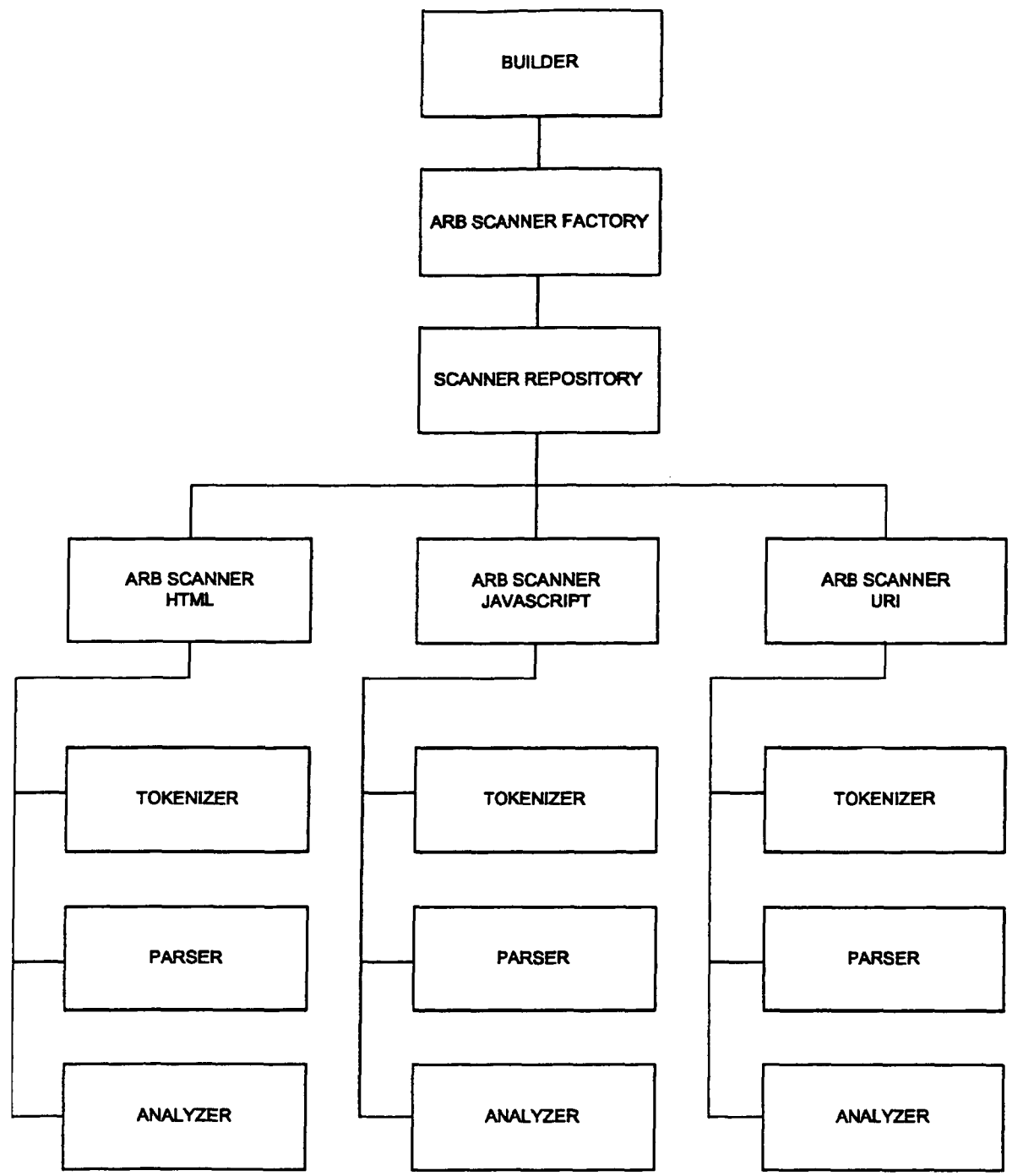
FIG. 8 illustrates a representative hierarchy of objects created by a builder module, in accordance with a preferred embodiment of the present invention.

Reference is now made to FIG. 8, which illustrates a representative hierarchy of objects created by builder module 720, in accordance with a preferred embodiment of the present invention. Shown in FIG. 8 are three types of content scanners: a scanner for HTML content, a scanner for JavaScript content, and a scanner for URI content. An advantage of the present invention is the ability to generate such a multitude of content scanners within a unified framework.

After ARB scanner factory module 730 is produced, builder module 720 calls a serialize( ) function. As such, the serialize( ) function called by builder module 720 causes all relevant classes to serialize themselves to the archive file recursively. Thereafter the archive file is sent to a client site.

After receiving the archive file, the client deserializes the archive file, and creates a global singleton object encapsulating an ARB scanner factory instance 750. The singleton is initialized by passing it a path to the archive file.

When the client downloads content from the Internet it preferably creates a pool of thread objects. Each thread object stores its ARB scanner factory instance 750 as member data. Whenever a thread object has content to parse, it requests an appropriate ARB scanner 760 from its ARB scanner factory object 750. Then, using the ARB scanner interface, the thread passes content and calls the requisite API functions to scan and process the content. Preferably, when the thread finishes scanning the content, it returns the ARB scanner instance 760 to its ARB scanner factory 750, to enable pooling the ARB scanner for later re-use.

It may be appreciated by those skilled in the art that use of archive files and scanner factories enables auto-updates of scanners whenever new versions of parser and analyzer rules are generated.

In reading the above description, persons skilled in the art will realize that there are many apparent variations that can be applied to the methods and systems described. Thus, although FIG. 6 describes a method in which a complete diagnostic of all match analyzer rules is produced, in an alternative embodiment the method may stop as soon as a first analyzer rule is matched. The parser would produce an incomplete diagnostic, but enough of a diagnostic to determine that the scanned content contains a potential exploit.

In addition to script and text files, the present invention is also applicable to parse and analyze binary content and EXE files. Tokens can be defined for binary content. Unlike tokens for text files that are generally delimited by punctuation characters, tokens for binary content generally have different characteristics.

Figure 9:
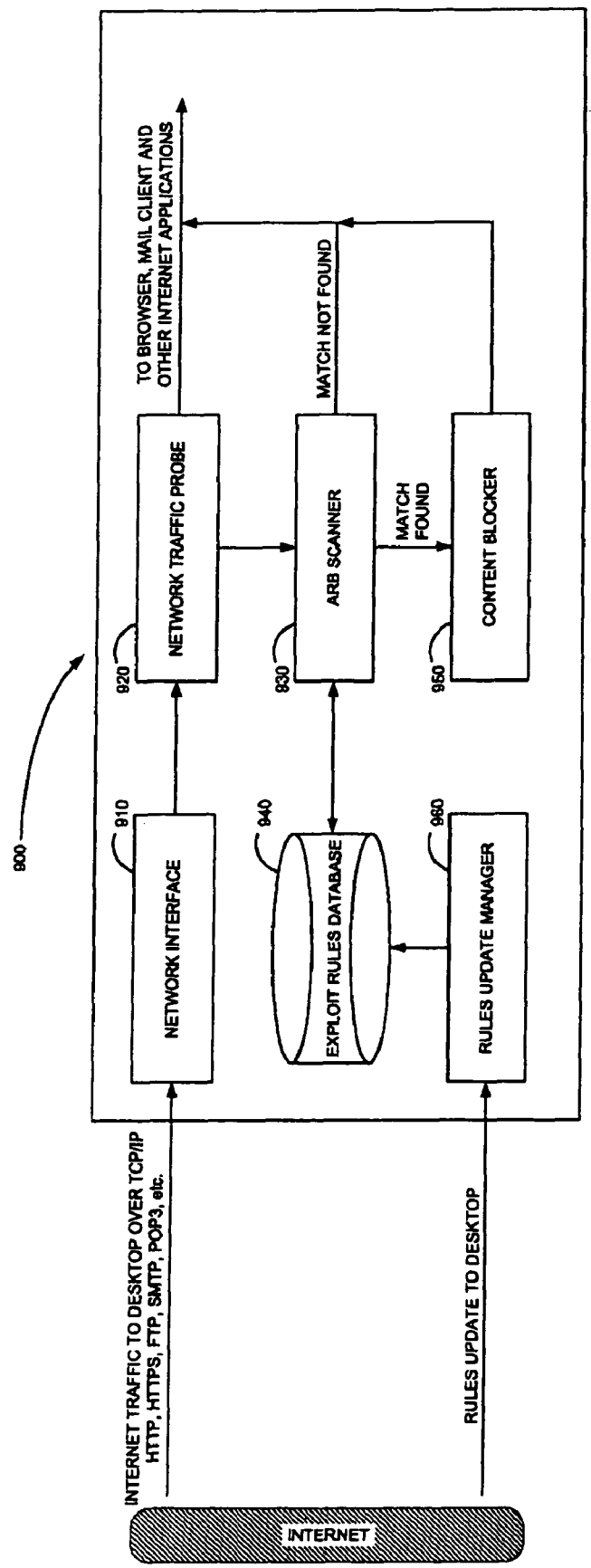
FIG. 9 is a simplified block diagram of a desktop computer implementation of an ARB content scanner, in accordance with a preferred embodiment of the present invention.

The present invention can be embodied within a network gateway, as described hereinabove, or alternatively within a client computer as a desktop application. Reference is now made to FIG. 9, which is a simplified block diagram of a desktop computer implementation of an ARB content scanner, in accordance with a preferred embodiment of the present invention. Shown in FIG. 9 is a desktop computer 900 including a network interface 910, which receives TCP/IP content from the Internet, including inter alia web pages via HTTP and secure HTTP, files via FTP, and e-mail via SMTP and POP3.

Desktop computer 900 preferably includes a network traffic probe 920, which generally passes incoming network traffic to its destination, be it a browser, e-mail client or other Internet application. However, in accordance with a preferred embodiment of the present invention, network traffic probe 920 selectively diverts incoming network traffic to ARB scanner 930. ARB scanner 930 scans and analyzes content to detect the presence of potential exploits. To this end, desktop computer 900 preferably maintains a database 940 of coded exploit rules in the form of deterministic or non-deterministic finite automata, which perform pattern matches appropriate to exploits under consideration. If ARB scanner 930 does not detect a match with a potential exploit, then the content is routed to its destination. Otherwise, if ARB scanner 930 detects the presence of potential exploits, then the suspicious content is passed to content blocker 950, which removes or inoculates such content.

In order to keep exploit rule database 940 current, desktop computer 900 preferably includes a rules update manager 960, which periodically receives modified rules and new rules over the Internet, and updates database 940 accordingly.

Figure 10:
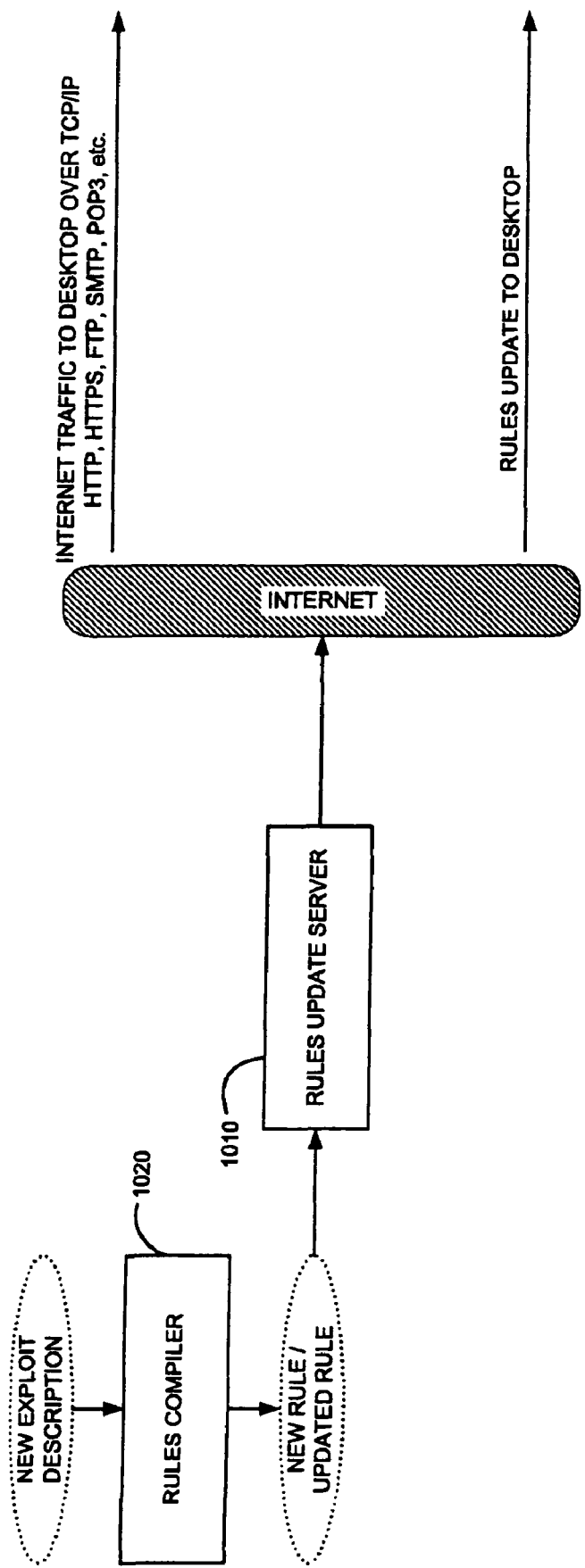
FIG. 10 is a simplified block diagram of a rule server that updates rule databases for the desktop computer of FIG. 9, in accordance with a preferred embodiment of the present invention.

Reference is now made to FIG. 10, which is a simplified block diagram of a rule server that updates rule databases for the desktop computer 900 of FIG. 9, in accordance with a preferred embodiment of the present invention. Shown in FIG. 10 is a rules update server computer 1010, which serves as a source for current exploit rules. Typically, when a rule is added for a new exploit, a rules compiler 1020 processes a semantic characterization of the exploit to produce an appropriate coded rule in the form of a deterministic or non-deterministic finite automaton. In turn, the newly coded rule is transmitted to desktop computer 900, for incorporation into its local database 940.

It may be appreciated that the mechanism of FIG. 10 enables rules update server 1010 to propagate the most up-to-date rules to a plurality of desktop computers, and enables rule engineers to continually build up a database of exploit rules.

The ability to distribute ARB scanners among desktop computers residing at the periphery of a network is of advantage to the entire network. Scanning results for mobile code, i.e., security profiles, are centrally cached at a network server or gateway, such as rules update server 1010, indexed according to IDs, such as hash values, for the mobile code; and made available to other desktop computers within the network. Use of IDs for caching security profiles is described in applicant's U.S. Pat. No. 6,804,780, entitled "System and Method for Protecting a Computer and a Network from Hostile Downloadables."

In accordance with a preferred embodiment of the present invention, desktop computer 900 includes a local cache for saving security profiles. The local cache communicates bi-directionally with the central network cache. Security profiles generated at desktop computer 900 are communicated to the central network cache, in order to update the central network cache; and conversely desktop computer 900 periodically updates itself from the central network cache, so as to maintain up-to-date security profiles.

When ARB scanner 930 receives content to scan, it first checks if a security profile for the content is already available in cache. If so, then ARB scanner 930 does not need to scan the content, and can use the security profile previously derived by itself or by an ARB scanner from another desktop computer. Thus it may be appreciated that desktop computers mutually benefit one another from the security profiles that they generate and share among themselves.

Figure 11:
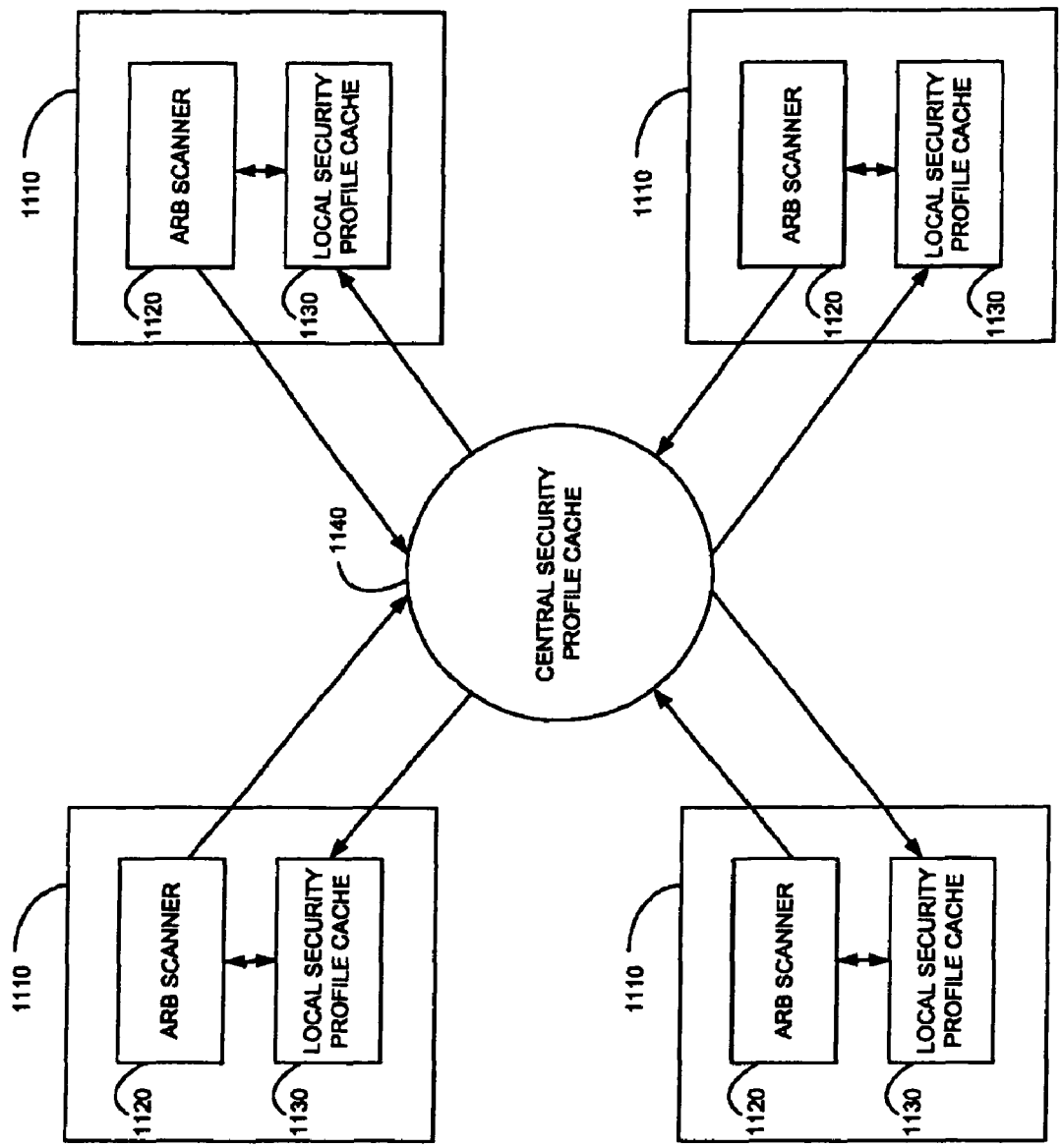
FIG. 11 is a simplified block diagram of a network security system that takes advantage of distributed ARB scanners to populate a central security profile cache, in accordance with a preferred embodiment of the present invention.

Reference is now made to FIG. 11, which is a simplified block diagram of a network security system that takes advantage of distributed ARB scanners to populate a central security profile cache, in accordance with a preferred embodiment of the present invention. Shown in FIG. 11 are four desktop computers 1110 inter-connected within a network. Each desktop computer includes its own ARB scanner 1120 and local security profile cache 1130. When processing incoming content, each ARB scanner 1120 preferably derives an ID for the content, such as a hash value, and checks local cache 1130 to ascertain whether or not a security profile already exists corresponding to the ID. If so, then ARB scanner 1120 uses the cached security profile, and does not need to derive a security profile for the content. If not, then ARB scanner 1120 derives a security profile for the content, and stores the content ID and security profile on local cache 1130.

Additionally, ARB scanner 1120 also transmits the content ID and security profile to a central security profile cache 1140 for storage. In this way, central security profile cache 1140 integrates security profile information from all of the desktop computers 1110. Periodically, each local security profile cache 1130 is updated based on information in central security profile cache 1140, so as to synchronize the local security profile caches. In this way, each local security profile cache 1130 within desktop computer 1110 benefits from the combined efforts of the other desktop computers.

It may be appreciated that the present invention applies beneficially to other types of distributed computers in addition to desktop computers, including inter alia mobile computers, wireless computers and cellular telephones.

Content scanned by ARB scanners may contain various elements assigned by a web server when the content is served to a client, such as HTML tags with date & time stamps. Such elements, if included when an ARB scanner derives an ID for the content, artificially distinguish between instances of the same content with different date & time stamps. In accordance with a preferred embodiment of the present invention, such elements are removed by an ARB scanner when deriving an ID for the content, so that the ID reflects the operational part of the content. The ID as derived by the present invention is thus invariant for multiple instances of the same mobile code that arrive at one or more ARB scanners at different times.

In applicant's U.S. Pat. Nos. 6,167,520 and 6,480,962, both entitled "System and Method for Protecting a Client during Runtime from Hostile Downloadables," there is described a desktop security system and method that operates by confining suspicious content to run within an isolated environment referred to as a "sand box." The sand box acts as a simulator in a "clean room" environment, and buffers suspicious operations from harming a computer system.

It may be appreciated that the sandbox invention and the present invention of desktop ARB scanning complement each other. Specifically, it is noted that the ARB scanner carries out a general behavioral analysis for content, which may be conditional upon specific data values. For example, an operating system command identified by the ARB scanner may or may not be harmful, depending upon values of various system parameters at the time the command is evoked. Such a command may be a harmful command that modifies crucial system data, or may be a harmless command simply to retrieve the current time and display it.

On the other hand, sandbox analysis of content only determines the behavior of suspicious code under specific conditions; namely, the conditions at the time the suspicious code is run. Unlike the ARB analysis, the sandbox analysis cannot predict the behavior of the suspicious code under different sets of conditions. Thus it may be appreciated that the sandbox and ARB analyses add significant value to one another, and can be synergistically combined.

By combining the sandbox and ARB analyses, behavior that is conditionally suspicious is better treated, so as to avoid over-blocking. The ARB scanner is relaxed to be more flexible and allow conditionally suspicious behavior to pass, knowing that the sandbox analysis will catch such behavior, if it proves to be harmful, while the content is trying to execute. In turn, malicious behavior recognized by the sandbox analysis is recorded in the security profile for the content, thereby producing a security profile that more accurately diagnoses conditionally suspicious behavior.

Figure 12:
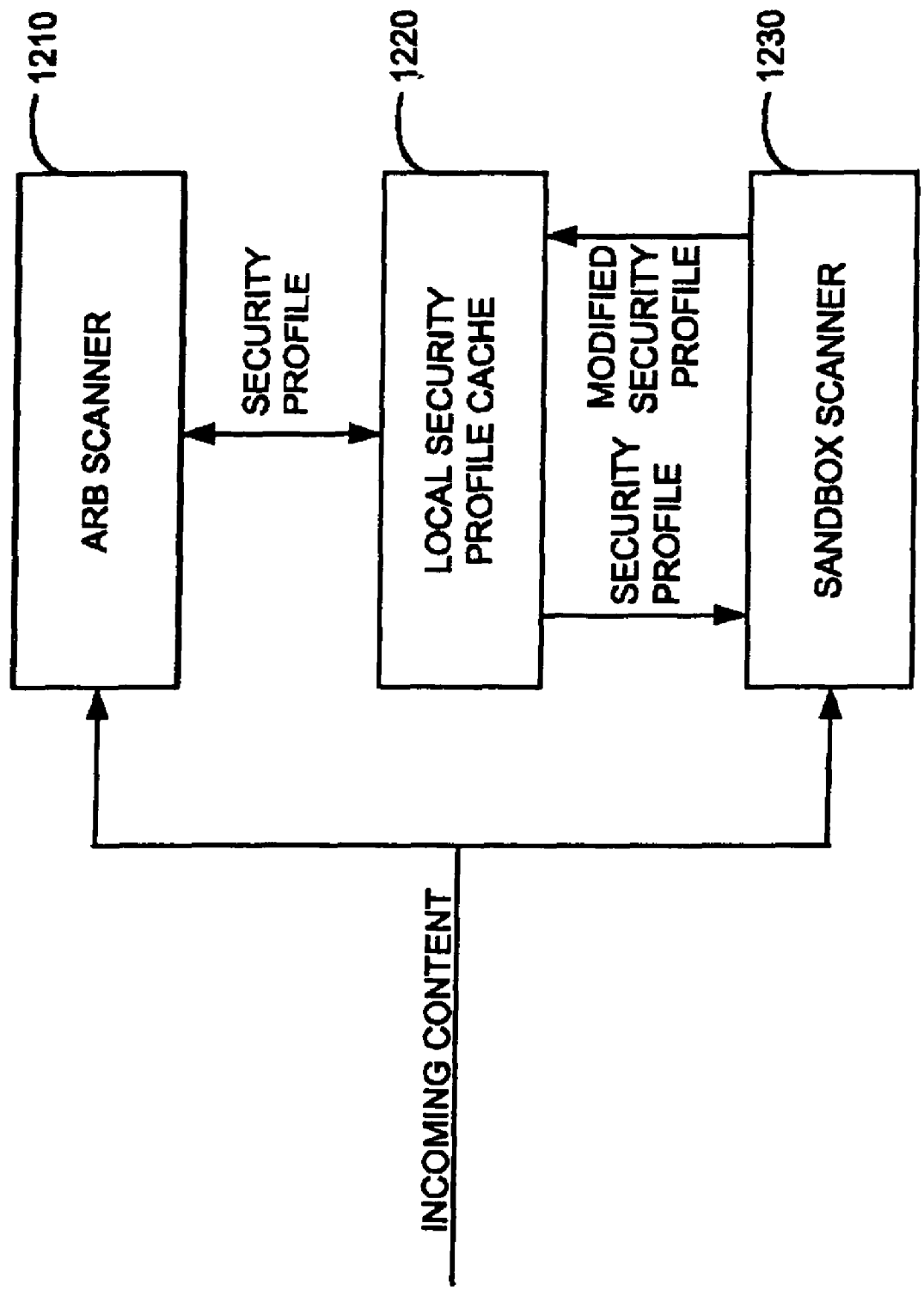
FIG. 12 is a simplified block diagram of an integrated content scanner including a general behavioral scanner and a sandbox scanner, in accordance with a preferred embodiment of the present invention.

Reference is now made to FIG. 12, which is a simplified block diagram of an integrated content scanner including a general behavioral scanner and a sandbox scanner, in accordance with a preferred embodiment of the present invention.

As shown in FIG. 12, incoming content is received by ARB scanner 1210. ARB scanner 1210 derives an ID for the content and checks a local security profile cache 1220 to determine whether or not a security profile for the content already resides in local cache. If so, then ARB scanner 1210 does not need to derive the security profile, saving significant processing time. If not, then ARB scanner 1210 performs a general behavioral scan of the content, using an adaptive rule-based analysis. ARB analysis is generally carried out without executing the content being analyzed. Such analysis often identifies conditionally malicious code; i.e., code that is or is not malicious depending upon values of operational data that are determined at run-time. Without further information, such content is generally blocked unconditionally in order not to compromise system security. However, such blocking of content with conditionally malicious code is a source of unwanted over-blocking.

In accordance with a preferred embodiment of the present invention, over-blocking of content with conditionally malicious code is mitigated by integrating ARB scanner 1210 with sandbox scanner 1230. Sandbox scanner 1230 analyzes content by executing the content within a protected environment, so that the content does not have access to critical system data including inter alia operating system data, file system data and network communication data. The analysis performed by sandbox scanner 1230 is specific to one set of values of operational data; namely, the values at the time the content is executed.

Whereas ARB scanner 1210 conducts a general behavioral analysis that identifies malicious code within content under general operating conditions, sandbox scanner 1230 conducts an analysis that is specific to one particular set of operating conditions. As a result, code that is identified as conditionally malicious by ARB scanner 1210 can be further analyzed by sandbox scanner 1230 to ascertain whether or not the code is malicious under a specific set of conditions. If sandbox scanner 1230 determines that the conditionally malicious code within the content is in fact malicious under the specific set of conditions, then preferably sandbox scanner 1230 modifies the security profile of the content to reflect the malicious behavior, thereby improving upon the security profile generated by ARB scanner 1210.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

APPENDIX A

```
vchars
{
  vchar ignore 0x00 "ignore"
  {
    [0x00–0xFF]+;
  }
  vchar ws 0x20
  {
    [0x09 0x0B 0x0C 0x20 0xA0]+;
  }
  vchar nl 0x0d
  {
    [0x0d]+;
    [0x0a]+;
  }
  vchar alphanum '?' "raw"
  {
```

APPENDIX A-continued

```
    [0x21–0x2f 0x30–0x39 0x3a–0x40 0x41–0x5A 0x5b–0x60 0x61–0x7A 0x7B–0x7E
0x7f–0x9F 0xA1–0xff];
  }
  vchar_alias underscore
  {
    0x5F;
  }
  vchar_alias equals
  {
    0x3D;
  }
...
  vchar_alias hash
  {
    0x23;
  }
  vchar_alias at
  {
    0x40;
  }
}
tokens
{
    TOKENIZER_DEFAULT        ".+";
    WS                       "[!ws!]"    punct  not-a-token;
    EOL                      "[!nl!]"    punct not-a-token;
    IDENT                    "[A–Za–z[!underscore!][!dollarsign!]][A–Za–z0–
9[!underscore!][!dollarsign!]]*";
    LBRACE                   "[!left_curly_bracket!]"        punct;
    RBRACE                   "[!right_curly_bracket!]"       punct;
    LPAREN                   "[!left_parenthesis!]"          punct;
    RPAREN                   "[!right_parenthesis!]"          punct;
    LBRACKET                  "[!left_square_bracket!]"       punct;
    RBRACKET                  "[!right_square_bracket!]"       punct;
...
    SINGLE_QUOTE             "[!single_quote!]"              punct;
    DOUBLE_QUOTE             "[!double_quote!]"               punct;
    COMMENT_OPEN             "[!slash!][!asterisk!]"         punct;
    COMMENT_CLOSE            "[!asterisk!][!slash!]"         punct;
    DOUBLE_SLASH             "[!slash!][!slash!]"            punct;
    INTEGER_DECIMAL          "[0–9]+";
    INTEGER_HEX              "0[xX][0–9A–Fa–f]+";
...
    cdata CDATA
    {
      DOUBLE_QUOTE DOUBLE_QUOTE "[!backslash!][!double_quote!]?"
"[^[!backslash!][!double_quote!]]+";
      SINGLE_QUOTE SINGLE_QUOTE "[!backslash!][!single_quote!]?"
"[^[!backslash!][!single_quote!]]+";
      COMMENT_OPEN COMMENT_CLOSE "[^[!asterisk!]]+";
      DOUBLE_SLASH EOL "[^[!nl!]]+";
    }
    VSEMICOLON       vdelim;
}
#defineOP PLUS | MINUS | SLASH | MULTIPLY | MOD
token_pairs
{
  invalid IDENT    IDENT;
  invalid IF       (ELSE | FOR | WHILE | DOT);
  invalid (OP)     (OP);
  valid    (PLUS | MINUS) (PLUS | MINUS);
  invalid INTEGER_DECIMAL   IDENT;
}
#define  Semicolon  (SEMICOLON | VSEMICOLON)
#define  Semicolon_    SEMICOLON VSEMICOLON
#defineActionClause (((Expr) Semicolon) | (Block))
parser_rules
{
  rule Eval
  {
    patterns
    {
      EVAL List;
    }
  }
  rule FuncSig
  {
    patterns
    {
      (FUNCTION) (IDENT?) (List);
```

APPENDIX A-continued

```
      }
      actions
      {
        this.val=$(2).val;
        @("FUNCNAME").val = $(2).val;
      }
    }
    rule FuncDecl
    {
      patterns
      {
        (FuncSig) Block;
      }
      actions
      {
        this.val=$(1).val;
        ~@("FUNCNAME");
      }
    }
    rule FuncCall
    {
      patterns
      {
        (IDENT) List;
      }
      actions
      {
        this.val=$(1).val;
      }
    }
...
#defineExprDelimTokens   Semicolon_ COMMA COLON
#defineExprLdelimTokens      LPAREN LBRACE ELSE DO IN THROW RETURN CASE VAR
#defineExprRdelimTokens      RPAREN RBRACE
#defineExprLdelimRules       IfClause WhileClause ForClause ForInClause WithClause
#defineExprExcludeRules      IfStmnt Expr
#defineExprStmntRules        FuncDecl IfElseStmnt IfNoElseStmnt WhileStmnt
DoWhileStmnt ForStmnt ForInStmnt SwitchStmnt WithStmnt TryCatchFinallyStmnt
TryCatchNoFinallyStmnt TryNoCatchFinallyStmnt ThrowStmnt ReturnStmnt LabelStmnt
CaseStmnt DefaultStmnt BreakStmnt ContinueStmnt VarStmnt DebuggerStmnt
NakedBlockStmnt NakedListStmnt
    rule Expr nonode
      {
      patterns
      {
        (
          [ExprDelimTokens ExprLdelimTokens ExprLdelimRules]?
          ([^ ExprDelimTokens ExprLdelimTokens ExprLdelimRules
ExprExcludeRules ExprRdelimTokens]+) [ExprDelimTokens ExprRdelimTokens] ) |
([ExprStmntRules]);
      }
      actions
      {
        addnode (children="2 3");
      }
    }
    rule BlockBegin nonode
    {
      patterns
      {
        LBRACE;
      }
      actions
      {
        @level++;
      }
    }
    rule Block
    {
      patterns
      {
        (LBRACE) (Expr Semicolon?)* (RBRACE);
      }
      actions
      {
        @level--;
      }
    }
    rule List
```

APPENDIX A-continued

```
    {
      patterns
      {
        (LPAREN) ((Expr) (COMMA Expr)*)? (RPAREN);
      }
    }
}
analyzer_rules
{
  RULE_DECL (Begin) nomatch
  {
    patterns
    {
      BEGIN;
    }
    actions
    {
      @("window", 0).attr += ATTR_WINDOW;
      @("self", 0).attr += ATTR_WINDOW;
      @("parent", 0).attr += ATTR_WINDOW;
    }
  }
  RULE_DECL (ScrWidExpr)
  {
    patterns
    {
      IDENT <val=="screen"> DOT IDENT <val=="width">;
    }
    actions
    {
      this.attr += ATTR_SCRWID;
    }
  }
  RULE_DECL (ScrHgtExpr)
  {
    patterns
    {
      IDENT <val=="screen"> DOT IDENT <val=="height">;
    }
    actions
    {
      this.attr += ATTR_SCRHGT;
    }
  }
  RULE_DECL (ScrWidAssign)
  {
    patterns
    {
      (IDENT) ASSIGNMENT IDENT <val=="screen"> DOT IDENT <val=="width">;
    }
    actions
    {
      @($(1).val).attr += ATTR_SCRWID;
    }
  }
  RULE_DECL (ScrHgtAssign)
  {
    patterns
    {
      (IDENT) ASSIGNMENT IDENT <val=="screen"> DOT IDENT <val=="height">;
    }
    actions
    {
      @($(1).val).attr += ATTR_SCRHGT;
    }
  }
  RULE_DECL (ScrWidHgtList)
  {
    patterns
    {
      LPAREN Expr COMMA Expr COMMA
        Expr <attr?=ATTR_SCRWID> COMMA
        Expr <attr?=ATTR_SCRHGT>;
    }
  }
  RULE_DECL (EXPLOIT) exploit
  {
    patterns
    {
```

APPENDIX A-continued

```
        <(matches(*):RULE(CreatePopup1) & matches(*):RULE(WndShowScrnWidHgt1)) |
        (matches(*):RULE(CreatePopup2) &
matches(*):RULE(WndShowScrnWidHgt2))>;
    }
}
RULE_DECL (CreatePopup1)
{
    patterns
    {
        (IDENT) ASSIGNMENT IDENT <@(val).attr?=ATTR_WINDOW>
            DOT FuncCall <val=="createPopup"> $;
    }
    actions
    {
        @($(1).val).attr += ATTR_WINDOW;
    }
}
RULE_DECL (WndShowScrnWidHgt1)
{
    patterns
    {
        IDENT <@(val).attr?=ATTR_WINDOW>
            DOT FuncCall <val=="show" & matches(1):RULE(ScrWidHgtList)>;
    }
}
RULE_DECL (WndShowScrnWidHgt2)
{
    patterns
    {
        (IDENT) DOT FuncCall <val=="show" &
matches(1):RULE(ScrWidHgtList)>;
    }
    actions
    {
        @($(1).val).attr += ATTR_WINDOW;
    }
}
RULE_DECL (CreatePopup2)
{
    patterns
    {
        IDENT <@(val).attr?=ATTR_WINDOW> ASSIGNMENT
            IDENT <@(val).attr?=ATTR_WINDOW>
            DOT FuncCall <val=="createPopup"> $;
    }
}
}
```

What is claimed is:

1. A security system for scanning content within a computer, comprising:
  a network interface, housed within a computer, for receiving incoming content from the Internet on its destination to an Internet application running on the computer;
  a database of parser and analyzer rules corresponding to computer exploits, stored within the computer, computer exploits being portions of program code that are malicious, wherein the parser and analyzer rules describe computer exploits as patterns of types of tokens, tokens being program code constructs, and types of tokens comprising a punctuation type, an identifier type and a function type;
  a rule-based content scanner that communicates with said database of parser and analyzer rules, operatively coupled with said network interface, for scanning incoming content received by said network interface to recognize the presence of potential computer exploits therewithin;
  a network traffic probe, operatively coupled to said network interface and to said rule-based content scanner, for selectively diverting incoming content from its intended destination to said rule-based content scanner; and
  a rule update manager that communicates with said database of parser and analyzer rules, for updating said database of parser and analyzer rules periodically to incorporate new parser and analyzer rules that are made available.

2. The security system of claim 1 wherein said database of parser and analyzer rules stores parser and analyzer rules in the form of pattern-matching engines.

3. The security system of claim 2 wherein the pattern-matching engines are deterministic finite automata.

4. The security system of claim 2 wherein the pattern-matching engines are non-deterministic finite automata.

5. The security system of claim 1 further comprising a content blocker, operatively coupled to said rule-based content scanner, for preventing incoming content having a computer exploit that was recognized by said rule-based content scanner from reaching its intended destination.

6. The system of claim 1 wherein the incoming content received from the Internet by said network interface is HTTP content.

7. The system of claim 1 wherein the incoming content received from the Internet by said network interface is HTTPS content.

8. The system of claim 1 wherein the incoming content received from the Internet by said network interface is FTP content.

9. The system of claim 1 wherein the incoming content received from the Internet by said network interface is SMTP content.

10. The system of claim 1 wherein the incoming content received from the Internet by said network interface is POP3 content.

11. The system of claim 1 wherein the destination Internet application is a web browser.

12. The system of claim 1 wherein the destination Internet application is an e-mail client.

13. A method for scanning content within a computer, comprising:
- receiving, at the computer, incoming content from the Internet on its destination to an Internet application;
- selectively diverting, by the computer, the received incoming content from its intended destination;
- scanning, by the computer, the selectively diverted incoming content to recognize potential computer exploits therewithin, based on a database of parser and analyzer rules corresponding to computer exploits, computer exploits being portions of program code that are malicious, wherein the parser and analyzer rules describe computer exploits as patterns of types of tokens, tokens being program code constructs, and types of tokens comprising a punctuation type, an identifier type and a function type; and
- updating the database of parser and analyzer rules periodically to incorporate new behavioral rules that are made available.

14. The method of claim 13 wherein said database of parser and analyzer rules stores parser and analyzer rules in the form of pattern-matching engines.

15. The method of claim 14 wherein the pattern-matching engines are deterministic finite automata.

16. The method of claim 14 wherein the pattern-matching engines are non-deterministic finite automata.

17. The method of claim 13 further comprising preventing incoming content having a computer exploit that was recognized by said scanning from reaching its intended destination.

18. The method of claim 13 wherein the incoming content received from the Internet by said network interface is HTTP content.

19. The method of claim 13 wherein the incoming content received from the Internet by said network interface is HTTPS content.

20. The method of claim 13 wherein the incoming content received from the Internet by said network interface is FTP content.

21. The method of claim 13 wherein the incoming content received from the Internet by said network interface is SMTP content.

22. The method of claim 13 wherein the incoming content received from the Internet by said network interface is POP3 content.

23. The method of claim 13 wherein the destination Internet application is a web browser.

24. The method of claim 13 wherein the destination Internet application is an e-mail client.

25. A computer-readable storage medium, the medium excluding signals, storing program code for causing a computer to perform the steps of:
- receiving incoming content from the Internet on its destination to an Internet application;
- selectively diverting the received incoming content from its intended destination;
- scanning the selectively diverted incoming content to recognize potential exploits therewithin, based on a database of parser and analyzer rules corresponding to computer exploits, computer exploits being portions of program code that are malicious, wherein the parser and analyzer rules describe exploits as patterns of types of tokens, tokens being program code constructs, and types of tokens comprising a punctuation type, an identifier type and a function type;
- and updating the database of parser and analyzer rules periodically to incorporate new parser and analyzer rules that are made available.

* * * * *